(12) United States Patent
Kataura et al.

(10) Patent No.: US 11,959,587 B2
(45) Date of Patent: Apr. 16, 2024

(54) BRACKET FOR ANTI-VIBRATION DEVICE

(71) Applicant: Prospira Corporation, Kawasaki (JP)

(72) Inventors: Mizuki Kataura, Kawasaki (JP);
Tadashi Onishi, Kawasaki (JP);
Masaaki Ohashi, Kawasaki (JP)

(73) Assignee: Prospira Corporation, Kawasaki (JP)

( * ) Notice: Subject to any disclaimer, the term of this patent is extended or adjusted under 35 U.S.C. 154(b) by 5 days.

(21) Appl. No.: 17/998,672

(22) PCT Filed: Mar. 19, 2021

(86) PCT No.: PCT/JP2021/011519
§ 371 (c)(1),
(2) Date: Nov. 14, 2022

(87) PCT Pub. No.: WO2021/261038
PCT Pub. Date: Dec. 30, 2021

(65) Prior Publication Data
US 2023/0341084 A1 Oct. 26, 2023

(30) Foreign Application Priority Data

Jun. 22, 2020 (JP) .................................. 2020-107254
Dec. 11, 2020 (JP) .................................. 2020-206254

(51) Int. Cl.
*F16M 13/02* (2006.01)
*B60K 5/12* (2006.01)

(52) U.S. Cl.
CPC ............... *F16M 13/02* (2013.01); *B60K 5/12* (2013.01); *F16F 2230/0005* (2013.01)

(58) Field of Classification Search
CPC ........ F16M 13/02; B60K 5/12; B60K 5/1225; B60K 5/1275; F16F 2230/0005;
(Continued)

(56) References Cited

U.S. PATENT DOCUMENTS 1,025,243 A * 5/1912 Carpenter et al. ........ F16L 3/14
248/62
6,561,471 B1 * 5/2003 Hawie .................. F16M 11/041
248/74.1
(Continued)

FOREIGN PATENT DOCUMENTS

| JP | 2005325922 A | 11/2005 |
| JP | 2013164150 A | 8/2013 |

(Continued)

OTHER PUBLICATIONS

Dec. 13, 2022, International Preliminary Report on Patentability issued in the International Patent Application No. PCT/JP2021/011519.

(Continued)

*Primary Examiner* — Muhammad Ijaz
(74) *Attorney, Agent, or Firm* — KENJA IP LAW PC

(57) ABSTRACT

A bracket (1) includes a bracket body (2) made of a synthetic resin and a reinforcement member (3) made of a fiber reinforced plastic. The bracket body (2) has a surrounding portion (20). The reinforcement member (3) extends in a surrounding direction. A reinforcement member arrangement portion (20a) of the surrounding portion (20) is formed of an outer circumference (211), an inner circumference (212), and a connecting portion (213). The reinforcement member arrangement portion (20a) is in the shape of a letter I in cross section in which the cross sectional width (W3) of the connecting portion (213) is narrower than the cross sectional width (W1) of the outer circumference (211) and the cross sectional width (W2) of the inner circumference (212). The reinforcement member (3) is arranged on the outer circumference (211).

20 Claims, 19 Drawing Sheets

(58) Field of Classification Search
CPC ......... F16F 1/3849; B29C 2045/14934; B29C 33/12; B29C 45/14
USPC ................................................ 248/205.1, 62
See application file for complete search history.

(56) References Cited

U.S. PATENT DOCUMENTS

| | | |
|---|---|---|
| 2012/0235334 A1 | 9/2012 | Suzuki |
| 2014/0166833 A1 | 6/2014 | Okumura |
| 2014/0346291 A1* | 11/2014 | Booth .................. H02G 3/32 |
| | | 248/74.4 |
| 2020/0300326 A1 | 9/2020 | Onishi et al. |
| 2020/0326019 A1* | 10/2020 | Hennon ............... F16L 3/1091 |
| 2021/0222800 A1* | 7/2021 | Koenig .................. F16L 57/06 |
| 2022/0194160 A1* | 6/2022 | Besting ................ F16F 1/3849 |
| 2023/0341084 A1* | 10/2023 | Kataura ............... F16F 1/3849 |
| 2024/0011537 A1* | 1/2024 | Onishi ................. F16F 1/3863 |

FOREIGN PATENT DOCUMENTS

| | | |
|---|---|---|
| JP | 2014119051 A | 6/2014 |
| JP | 2019078380 A | 5/2019 |
| WO | 2012124060 A1 | 9/2012 |

OTHER PUBLICATIONS

Apr. 20, 2021, International Search Report issued in the International Patent Application No. PCT/JP2021/011519.

* cited by examiner

BRACKET FOR ANTI-VIBRATION DEVICE

TECHNICAL FIELD

The present disclosure relates to a bracket for an anti-vibration device.

BACKGROUND

Some of conventional brackets for anti-vibration devices are of a type in which a reinforcement member made of a fiber reinforced plastic is fixed to an outer circumference of a surrounding portion of a bracket body made of a synthetic resin, for the purpose of achieving both weight reduction and durability improvement (see, Patent Literature (PTL) 1, for example).

CITATION LIST

Patent Literature

PTL 1: JP 2019-78380 A

SUMMARY

Technical Problem

However, there is room for improvement in the conventional brackets for anti-vibration devices described above, in terms of ensuring durability while further reducing weight.

It would be helpful to provide a bracket for an anti-vibration device that can ensure durability while further reducing weight.

Solution to Problem

A bracket for an anti-vibration device according to the present disclosure includes a bracket body made of a synthetic resin and a reinforcement member made of a fiber reinforced plastic, the bracket body having a surrounding portion surrounding a main body of the anti-vibration device, the reinforcement member extending in a surrounding direction of the surrounding portion and being arranged in the surrounding portion,
wherein
a reinforcement member arrangement portion of the surrounding portion is formed of an outer circumference extending in the surrounding direction, an inner circumference extending in the surrounding direction, and a connecting portion connecting the outer circumference and the inner circumference and extending in the surrounding direction,
when the reinforcement member arrangement portion is viewed in a cross section perpendicular to the surrounding direction, the reinforcement member arrangement portion is in the shape of a letter I in the cross section in which the cross sectional width of the connecting portion is narrower than the cross sectional width of the outer circumference and the cross sectional width of the inner circumference, and
the reinforcement member is arranged on the outer circumference of the reinforcement member arrangement portion.

According to the bracket for an anti-vibration device of the present disclosure, it is possible to ensure durability while further reducing weight.

In the bracket for an anti-vibration device according to the present disclosure, the cross sectional width of the inner circumference is preferably narrower than the cross sectional width of the outer circumference. In this case, the weight can be further reduced.

In the bracket for an anti-vibration device according to the present disclosure, the cross sectional width of the outer circumference can be the same as the cross sectional width of the inner circumference, or narrower than the cross sectional width of the inner circumference. In this case, while maintaining a good strength balance between the outer circumference and the inner circumference, it is possible to further reduce weight and improve durability.

In the bracket for an anti-vibration device according to the present disclosure, when the inner circumference is viewed in a cross section perpendicular to the surrounding direction, an inner circumferential-side surface of the inner circumference preferably has an outline convex toward an inner circumferential side. In this case, the durability can be further improved.

In the bracket for an anti-vibration device according to the present disclosure, of the convex outline, an axial central portion of the inner circumferential-side surface can be formed of an outwardly convex curve. In this case, the durability can be further improved.

In the bracket for an anti-vibration device according to the present disclosure, of the convex outline, an axial end portion of the inner circumferential-side surface can be formed of a straight line. In this case, the weight can be further reduced.

In the bracket for an anti-vibration device according to the present disclosure, a plurality of bottom ribs that extend in an axial perpendicular direction and are arranged at intervals in an axial direction are preferably formed in a bottom of the bracket body, and the thickness of the plurality of bottom ribs is preferably thicker the closer the bottom ribs are to the center of the bottom in the axial direction. In this case, the light weight can be further improved.

In the bracket for an anti-vibration device according to the present disclosure, an inner circumferential-side surface of the outer circumference can have a gate mark for injection molding. In this case, the reinforcement member is firmly fixed to the bracket body without impairing an appearance.

In the bracket for an anti-vibration device according to the present disclosure, a side surface of the connecting portion preferably includes a curved surface that is connected to an inner circumferential-side surface of the outer circumference and is formed of an inwardly concave curve when viewed in the cross section, and a curved surface that is connected to an outer circumferential-side surface of the inner circumference and is formed of an inwardly concave curve when viewed in the cross section. In this case, the durability can be improved by alleviating stress concentration occurring at the bracket body.

In the bracket for an anti-vibration device according to the present disclosure, an inner circumferential-side surface of the outer circumference, an outer circumferential-side surface of the inner circumference, and a side surface of the connecting portion preferably form a concave portion extending in the surrounding direction, in the reinforcement member arrangement portion of the surrounding portion. In this case, the durability can be improved by alleviating stress concentration occurring at the bracket body.

Advantageous Effect

According to the present disclosure, it is possible to provide the bracket for an anti-vibration device that can ensure durability while further reducing weight.

DETAILED DESCRIPTION

Brackets 1 for anti-vibration devices according to some embodiments of the present disclosure will be described below with reference to the drawings.

Figure 1:
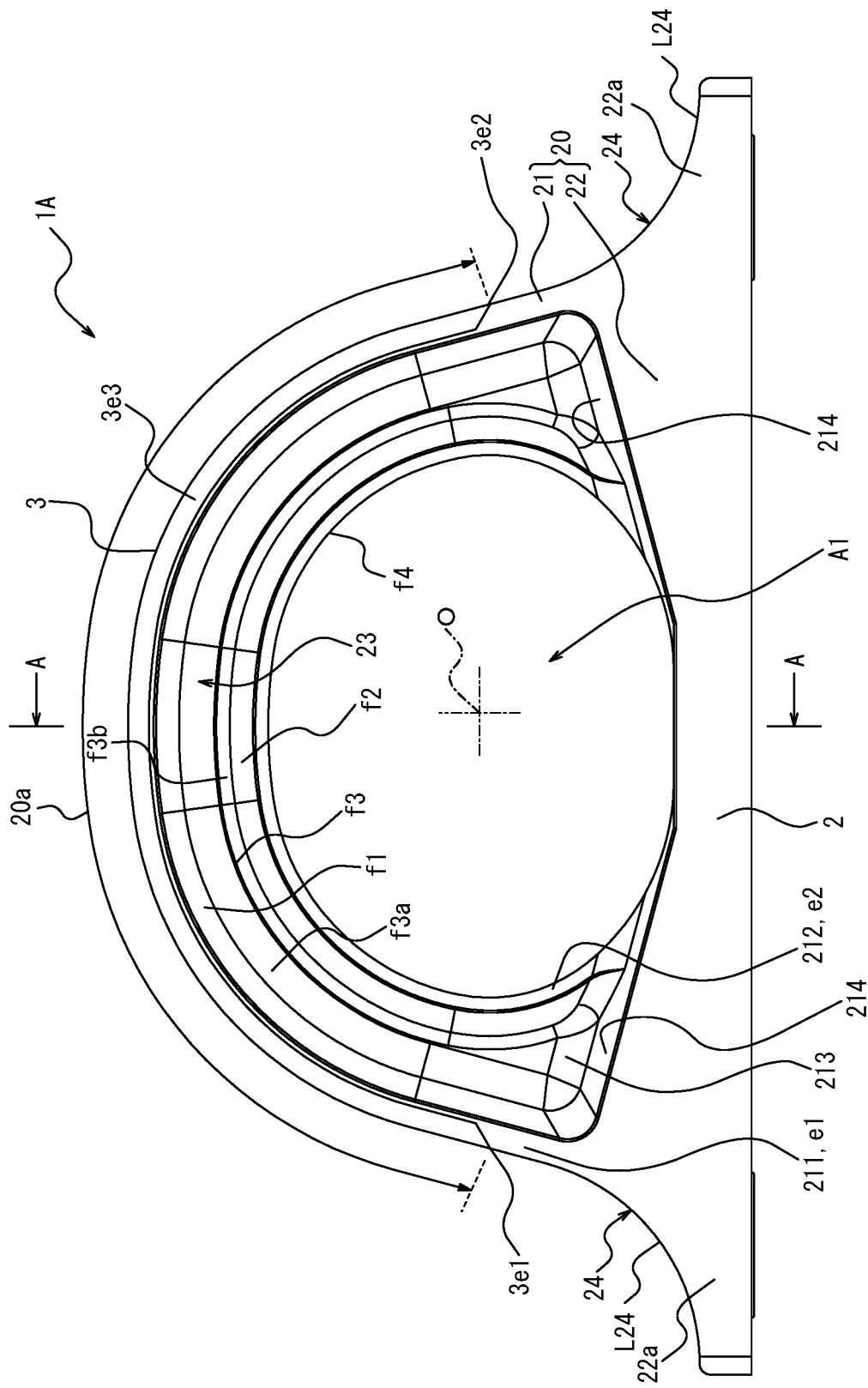
FIG. 1 is a front view of a bracket for an anti-vibration device according to a first embodiment.

FIG. 1 is a front view of a bracket 1A for an anti-vibration device (also referred to simply as "bracket 1A") according to a first embodiment. FIG. 1 is a so-called left-right view at the time of mounting the bracket 1A on a vehicle, when the bracket 1A is viewed from a left-right direction of the vehicle. In the following description, FIG. 1 is a view of the bracket 1A viewed from the left at the time of mounting the bracket 1A on the vehicle. In other words, the left direction in FIG. 1 is a front direction at the time of mounting the bracket 1A on the vehicle, and the right direction in FIG. 1 is a rear direction at the time of mounting the bracket 1A on the vehicle. In the following description, the upper direction in FIG. 1 is an upper direction at the time of mounting the bracket 1A on the vehicle, and the lower direction in FIG. 1 is a lower direction at the time of mounting the bracket 1A on the vehicle.

The bracket 1A is an engine mount bracket. The bracket 1A can be connected to a vehicle body. The bracket 1A has a through hole A1. In the present embodiment, the through hole A1 is a through hole formed in a bracket body 2. The through hole A1 can accommodate a main body of the anti-vibration device (not illustrated). The main body of the anti-vibration device can be connected to the engine. Thereby, the bracket 1A can connect the vehicle body and the engine via the main body of the anti-vibration device.

In the drawings, the main body of the anti-vibration device is omitted. The main body of the anti-vibration device is, for example, an anti-vibration member in which an inner cylinder and an outer cylinder are connected by an elastic material (e.g., rubber). In such an anti-vibration member, the outer cylinder is attached to the bracket body 2 while the inner cylinder is attached to the engine.

However, the bracket 1A can connect the bracket body 2 to the engine while connecting the main body of the anti-vibration device to the vehicle body. The bracket 1A is not limited to the engine mount bracket. The bracket 1A can connect the bracket body 2 to one of a vibration generating side and a vibration receiving side, other than the engine and the vehicle body, while connecting the main body of the anti-vibration device to the other of the vibration generating side or the vibration receiving side.

The symbol O denotes a central axis of the bracket 1A (hereinafter simply referred to as "central axis O"). In the present embodiment, the central axis O is coaxial with a central axis of the through hole A1. In the present embodiment, a direction in which the central axis O extends is referred to as an "axial direction". In the present embodiment, the "axial direction" is synonymous with a "left-right direction at the time of mounting the bracket 1A on the vehicle". In the present embodiment, directions perpendicular to the central axis O are referred to as "axial perpendicular directions". In the present embodiment, the "axial perpendicular directions" include a "front-back direction at the time of mounting the bracket 1A on the vehicle" and a "vertical direction at the time of mounting the bracket 1A on the vehicle". Furthermore, in the present embodiment, in cross section perpendicular to the central axis O (cross section in the axial perpendicular direction), a direction extending annularly around the central axis O is referred to as a "circumferential direction".

The bracket 1A has the bracket body 2 made of a synthetic resin and a reinforcement member 3 made of a fiber reinforced plastic.

The synthetic resin forming the bracket body 2 includes, for example, thermoplastic synthetic resins, thermosetting synthetic resins, and the like. As the synthetic resin, a thermoplastic synthetic resin is suitably used. Such a thermoplastic synthetic resin is, for example, 6-6 nylon, 6 nylon, 9 nylon, polypropylene, or the like.

The bracket body 2 has a surrounding portion that surrounds the main body of the anti-vibration device.

In the present embodiment, the surrounding portion 20 has a first surrounding portion 21 and a second surrounding portion 22. The second surrounding portion 22 is a fixed base that can be fixed to the vehicle body. In the present embodiment, the second surrounding portion 22 has protrusion portions 22a that protrude outwardly in the axial perpendicular direction with respect to the first surrounding portion 21. In the present embodiment, the protrusion portions 22a protrude outwardly in the front-back direction at the time of mounting the bracket 1A on the vehicle, with respect to the first surrounding portion 21.

The first surrounding portion 21 and the second surrounding portion 22 are integrally formed of the same synthetic resin. The through hole A1 is formed by the first surrounding portion 21 and the second surrounding portion 22. As described above, the through hole A1 can accommodate the main body of the anti-vibration device. At this time, the first surrounding portion 21 surrounds the main body of the anti-vibration device, together with the second surrounding portion 22. As illustrated in FIG. 1, in the present embodiment, the first surrounding portion 21 is a bridge that is bridged over the second surrounding portion 22 in the shape of an arch viewed in the left-right direction at the time of mounting the bracket 1A on the vehicle.

A reinforcement member arrangement portion 20a of the surrounding portion 20 includes an outer circumference 211 extending in a surrounding direction, an inner circumference 212 extending in the surrounding direction, and a connecting portion 213 that connects the outer circumference 211 and the inner circumference 212 while extending in the surrounding direction.

Here, the surrounding direction refers to a direction in which the surrounding portion 20 extends around the central axis O. In the present embodiment, the surrounding direction is synonymous with the circumferential direction. In the present embodiment, the outer circumference 211, inner circumference 212, and connecting portion 213 are integrally made of the same synthetic resin.

Figure 2:
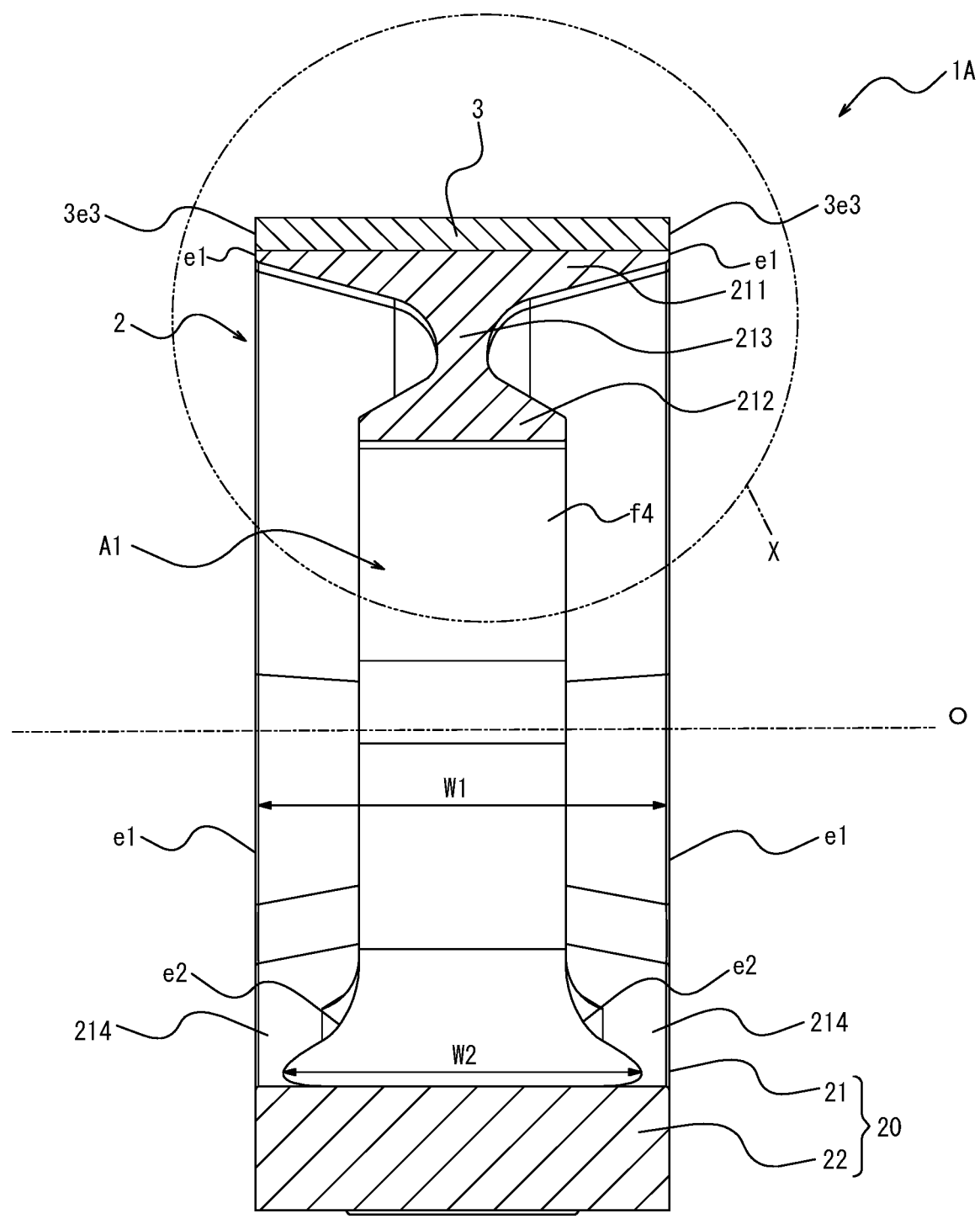
FIG. 2 is an A-A cross sectional view of FIG. 1.
Figure 3:
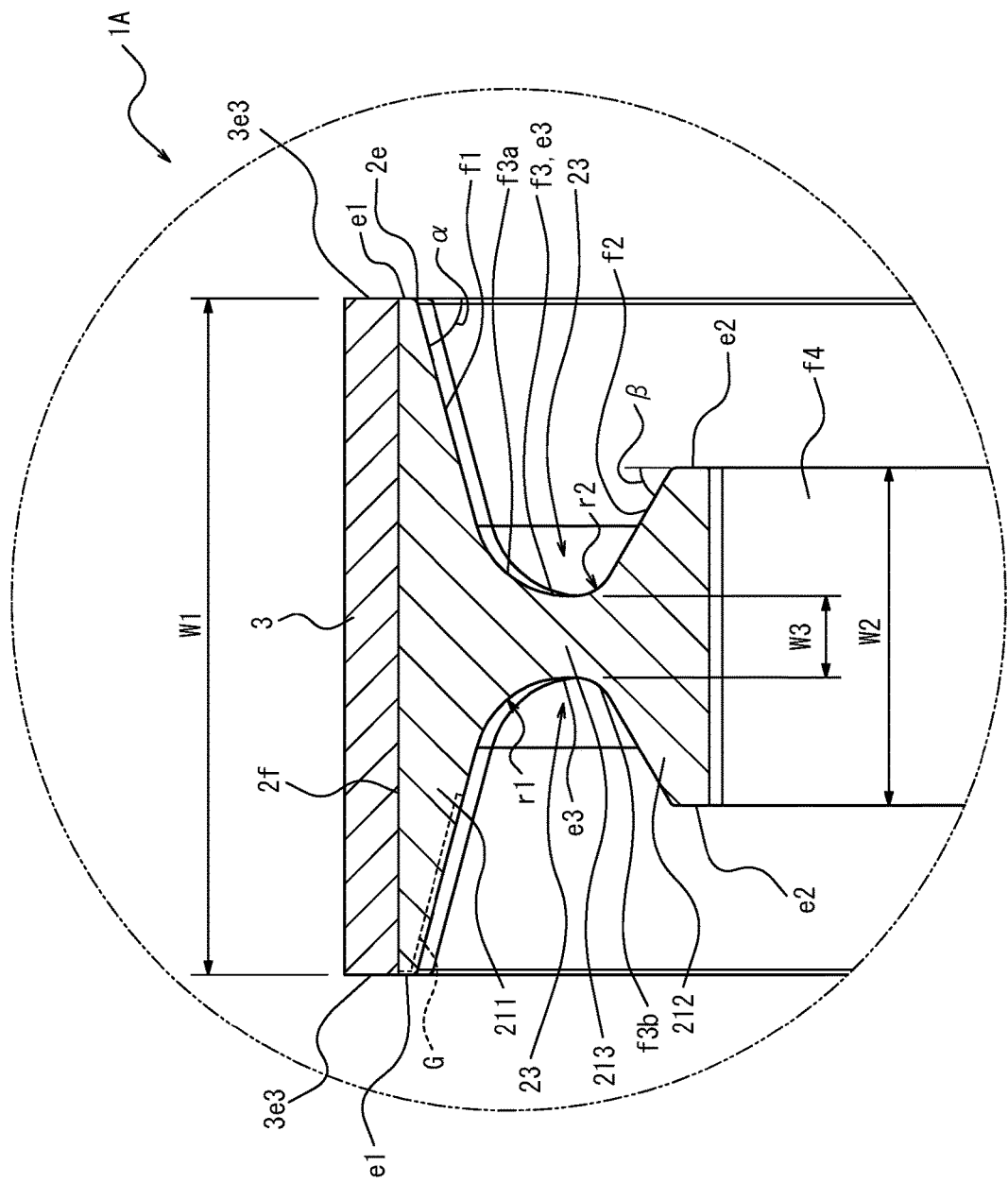
FIG. 3 is an enlarged view of FIG. 2.

FIG. 2 is an A-A cross sectional view of FIG. 1. FIG. 2 illustrates the reinforcement member arrangement portion 20a in cross section perpendicular to the surrounding direction. In FIG. 2, the cross section is cross section in the axial direction formed by a plane including the central axis O. FIG. 3 is an enlarged view of FIG. 2.

Referring to FIG. 3, when the reinforcement member arrangement portion 20a is viewed in cross section perpendicular to the surrounding direction, the reinforcement member arrangement portion 20a is in the shape of a letter I in cross section in which the cross sectional width W3 of the connecting portion 213 is narrower than the cross sectional width W1 of the outer circumference 211 and the cross sectional width W2 of the inner circumference 212.

Furthermore, in the present embodiment, the cross sectional width W2 of the inner circumference 212 is narrower than the cross sectional width W1 of the outer circumference 211.

Referring now to FIG. 3, the "cross sectional widths" are the widths of subject portions (the outer circumference 211, inner circumference 212, and connecting portion 213) in the axial direction that extends in the axial direction in the axial cross sectional view of FIG. 3.

Referring to FIG. 3, in the present embodiment, the outer circumference 211 has a flat rectangular cross section along the axial direction in the axial cross sectional view. The cross sectional width W1 of the outer circumference 211 is the width between axial ends e1 of the outer circumference 211. Referring to FIG. 3, in the present embodiment, the inner circumference 212 has a flat rectangular cross section along the axial direction in the axial cross sectional view. The cross sectional width W2 of the inner circumference 212 is the width between axial ends e2 of the inner circumference 212. Referring to FIG. 3, in the present embodiment, the connecting portion 213 has a flat rectangular cross section along the axial perpendicular direction in the axial cross sectional view. The cross sectional width W3 of the connecting portion 213 is the width between portions that are the closest to each other in the axial direction, of axial ends e3 of the connecting portion 213.

Furthermore, in the present embodiment, side surfaces f3 of the connecting portion 213 each include an outer circumferential-side curved surface f3a that is connected to an inner circumferential-side surface f1 of the outer circumference 211 and is formed of an inwardly concave curve when viewed in the cross section, and an inner circumferential-side curved surface f3b that is connected to an outer circumferential-side surface f2 of the inner circumference 212 and is formed of an inwardly concave curve when viewed in the cross section.

Referring to FIG. 3, in the present embodiment, the inner circumferential-side surface f1 of the outer circumference 211 is a plane formed with straight lines in the axial cross sectional view. The inner circumferential-side surface f1 of the outer circumference 211 is connected to the axial ends e1 of the outer circumference 211 at an acute side angle α with respect to the axial perpendicular direction. Similarly, in the present embodiment, the outer circumferential-side surface f2 of the inner circumference 212 is a plane formed with straight lines in the axial cross sectional view. The outer circumferential-side surface f2 of the inner circumference 212 is connected to the axial ends e2 of the inner circumference 212 at an acute side angle β with respect to the axial perpendicular direction.

Furthermore, referring to FIG. 3, in the present embodiment, the outer circumferential-side curved surface f3a of the connecting portion 213 is a curve inwardly concave in the axial direction that is formed with a curve of a radius of curvature r1 in the axial cross sectional view. Also, in the present embodiment, the inner circumferential-side curved surface f3b of the connecting portion 213 is a curve inwardly concave in the axial direction that is formed with a curve of a radius of curvature r2 in the axial cross sectional view. The radius of curvature r1 and the radius of curvature r2 can be the same. Alternatively, the radius of curvature r1 and the radius of curvature r2 can be different.

Furthermore, in the present embodiment, the inner circumferential-side surface f1 of the outer circumference 211, the outer circumferential-side surface f2 of the inner circumference 212, and the side surfaces f3 of the connecting portion 213 form, in the reinforcement member arrangement portion 20a of the surrounding portion 20, a recess 23 extending in the surrounding direction.

Referring back to FIG. 1, in the present embodiment, the recess 23 has two surrounding directional end surfaces 214. The surrounding directional end surfaces 214 are surfaces that form surrounding directional ends of the recess 23. The surrounding directional end surfaces 214 define the extent to which the recess 23 extends in the surrounding direction. The surrounding directional end surfaces 214 are connected to each of the inner circumferential-side surface f1 of the outer circumference 211, the outer circumferential-side surface f2 of the inner circumference 212, and the side surfaces f3 of the connecting portion 213. In other words, in the present embodiment, the recess 23 is formed by the outer circumference 211, the inner circumference 212, the connecting portion 213, and the surrounding directional end surfaces 214. Furthermore, referring to FIG. 2, in the present embodiment, the surrounding directional end surfaces 214 are connected to the through hole A1. Thereby, in the present embodiment, the recess 23 is open to the through hole A1 at ends in the surrounding direction.

Referring to FIG. 2, in the present embodiment, in the reinforcement member arrangement portion 20a of the surrounding portion 20, the cross sectional width W2 of the inner circumference 212 is basically constant from an upper direction to a lower direction at the time of mounting the bracket 1A on the vehicle, through the central axis O. However, in the present embodiment, as illustrated in FIG. 2, the cross sectional width W2 of the inner circumference 212 widens from a predetermined position below the central axis O, at the time of mounting the bracket 1A on the vehicle, toward the second surrounding portion 22. In the present embodiment, the cross sectional width W2 has its maximum width at a constant distance from the second surrounding portion 22. Then, the cross sectional width W2 becomes narrower from the maximum width of the cross sectional width W2, as a distance to the second surrounding portion 22 is further reduced. Referring to perspective views of FIGS. 7 and 8, in the present embodiment, axial ends e2 of the inner circumference 212 are formed with curves of a radius of curvature r22, in the vicinity of the second surrounding portion 22.

The reinforcement member arrangement portion 20a of the surrounding portion 20 is reinforced by disposition of the reinforcement member 3. The reinforcement member 3 is made of a fiber reinforced plastic (FRP).

The (continuous) fiber reinforced plastic is a composite material in which a synthetic resin is contained in fibrous elements to increase strength. The fiber reinforced plastic includes, for example, prepreg. The fibrous elements include, for example, glass fiber fabrics, carbon fiber fabrics, metal fiber fabrics, organic fibers, fiber fabrics with higher bending strength than the bracket body 2, and other materials containing these fabrics. As the fibrous elements, glass fiber fabrics are suitably used. The fiber reinforced plastic includes, for example, a UD (Uni Direction) material in which the synthetic resin is contained in the fibrous elements with directional properties, and a woven material in which the synthetic resin is contained in the woven fibrous elements. The bracket 1 can be formed in one piece by injection molding, for example, with the reinforcement member 3 as an insert. In the bracket 1 according to the present embodiment, for example, the fibrous elements are arranged in a direction oriented in the surrounding direction.

Referring to FIG. 1, the reinforcement member 3 extends in the surrounding direction of the surrounding portion 20 and is disposed in the surrounding portion 20.

Figure 4:
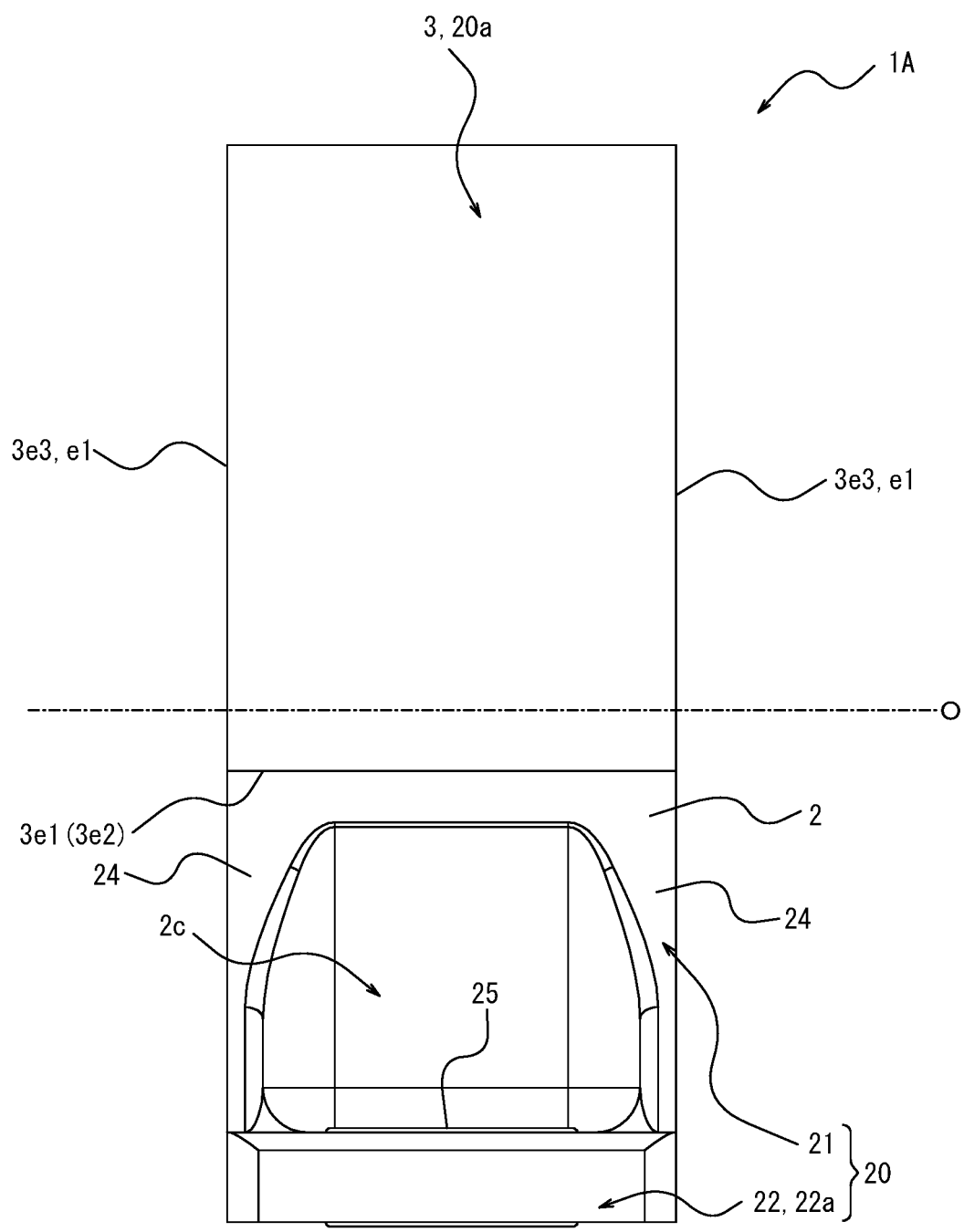
FIG. 4 is a left side view of FIG. 1.
Figure 5:
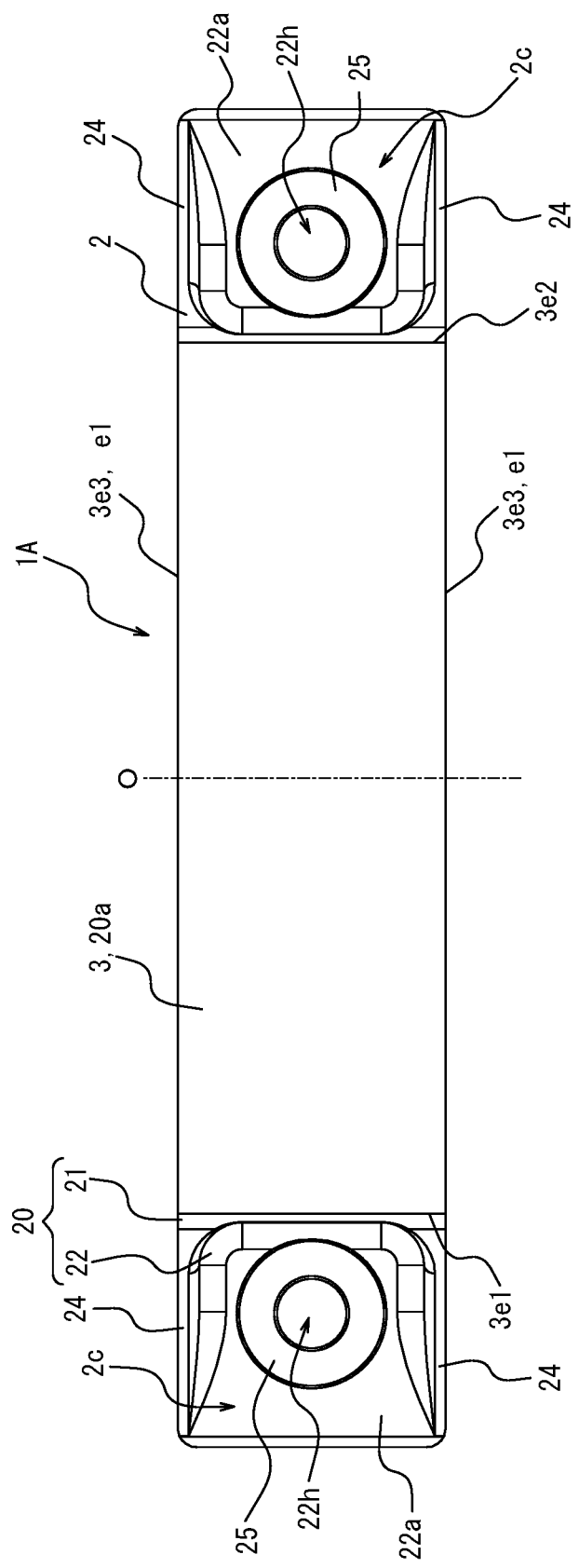
FIG. 5 is a plan view of FIG. 1.

In the present embodiment, the reinforcement member 3 is disposed in the first surrounding portion 21. In FIG. 1, the reference numeral 3e1 denotes an end of the reinforcement member 3 at one side in an extending direction. The reference numeral 3e2 denotes the other end of the reinforcement member 3 in the extending direction. The reinforcement member 3 is a strip-shaped reinforcement member. Referring to FIG. 2, in the present embodiment, the cross sectional width of the reinforcement member 3 is equal to the cross sectional width W1 of the outer circumference 211. In more detail, an axial end 3e3 of the reinforcement member 3 coincides with the axial end e1 of the outer circumference 211. Referring to FIGS. 4 and 5, in the present embodiment, a cross sectional width W4 of the reinforcement member 3 is constant along the surrounding direction. Therefore, in the present embodiment, in the first surrounding portion 21, the cross sectional width W1 of the outer circumference 211 is constant along the surrounding direction.

Referring to FIG. 5, in the present embodiment, two fixing holes 22h are formed in the second surrounding portion 22. As illustrated in FIG. 5, in plan view, the two fixing holes 22h are arranged at a distance from each other in the axial perpendicular direction across the first surrounding portion 21. In the present embodiment, the fixing holes 22h are disposed in concavities 2c provided in the bracket body 2. The concavities 2c are in such a form as to cut out a part of the first surrounding portion 21. In the present embodiment, as illustrated in FIGS. 4 and 5, each of the concavities 2c is formed of the protrusion portion 22a of the second surrounding portion 22 and two ridge ribs 24. In the present embodiment, the fixing holes 22h are formed in anchors 25 attached to the protrusion portions 22a of the concavities 2c.

Referring to FIG. 5, in the present embodiment, the reinforcement member 3 is arranged so that, at the time of mounting the bracket 1A on the vehicle, front and rear portions of the reinforcement member arrangement portion 20a are equally reinforced across the central axis O. However, the portions reinforced by the reinforcement member 3 can be different in the front and rear directions at the time of mounting the bracket 1A on the vehicle.

In the present embodiment, the reinforcement member 3 is disposed in the outer circumference 211 of the reinforcement member arrangement portion 20a.

Figure 7:
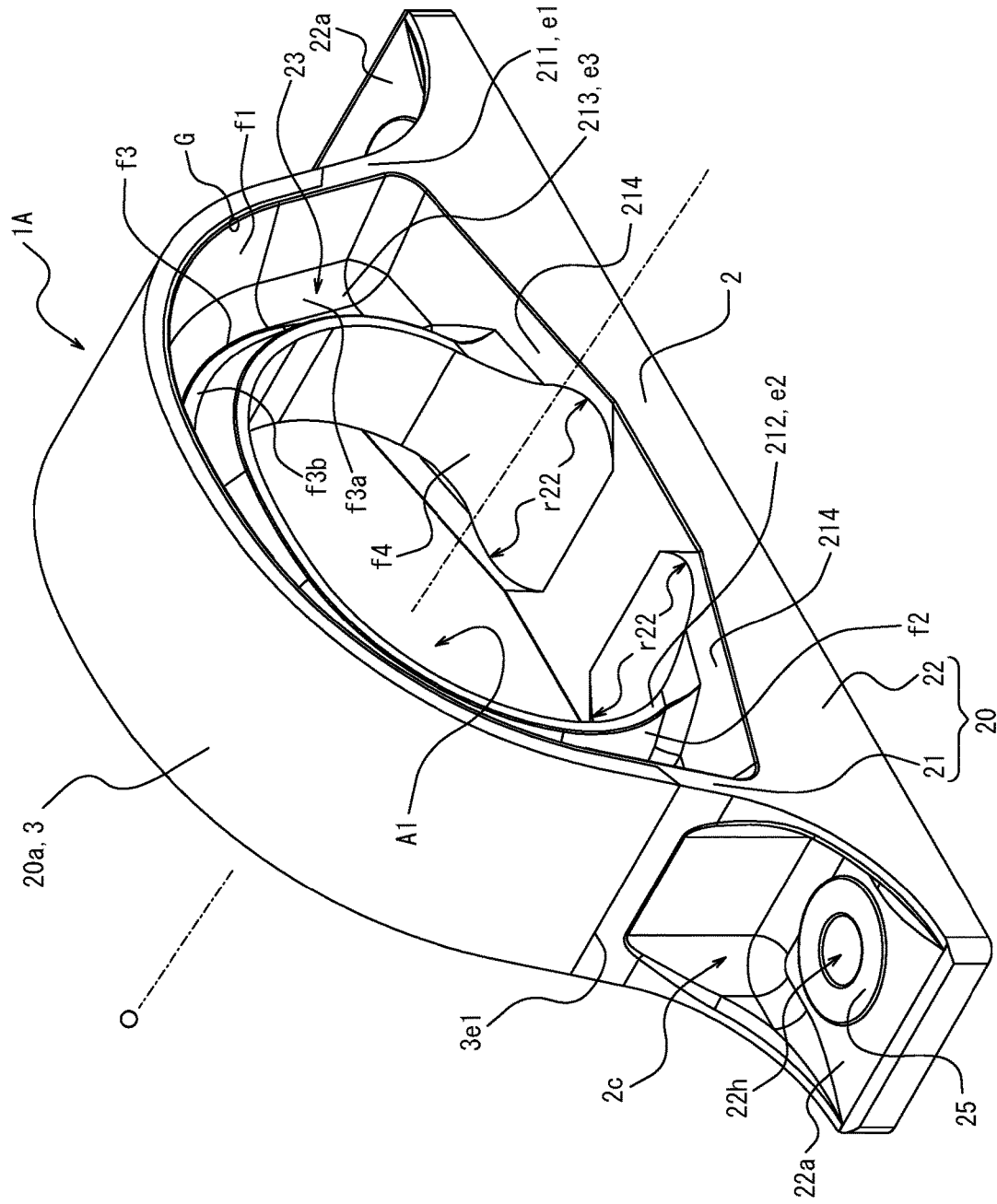
FIG. 7 is a perspective view illustrating FIG. 1 from a front left side.
Figure 8:
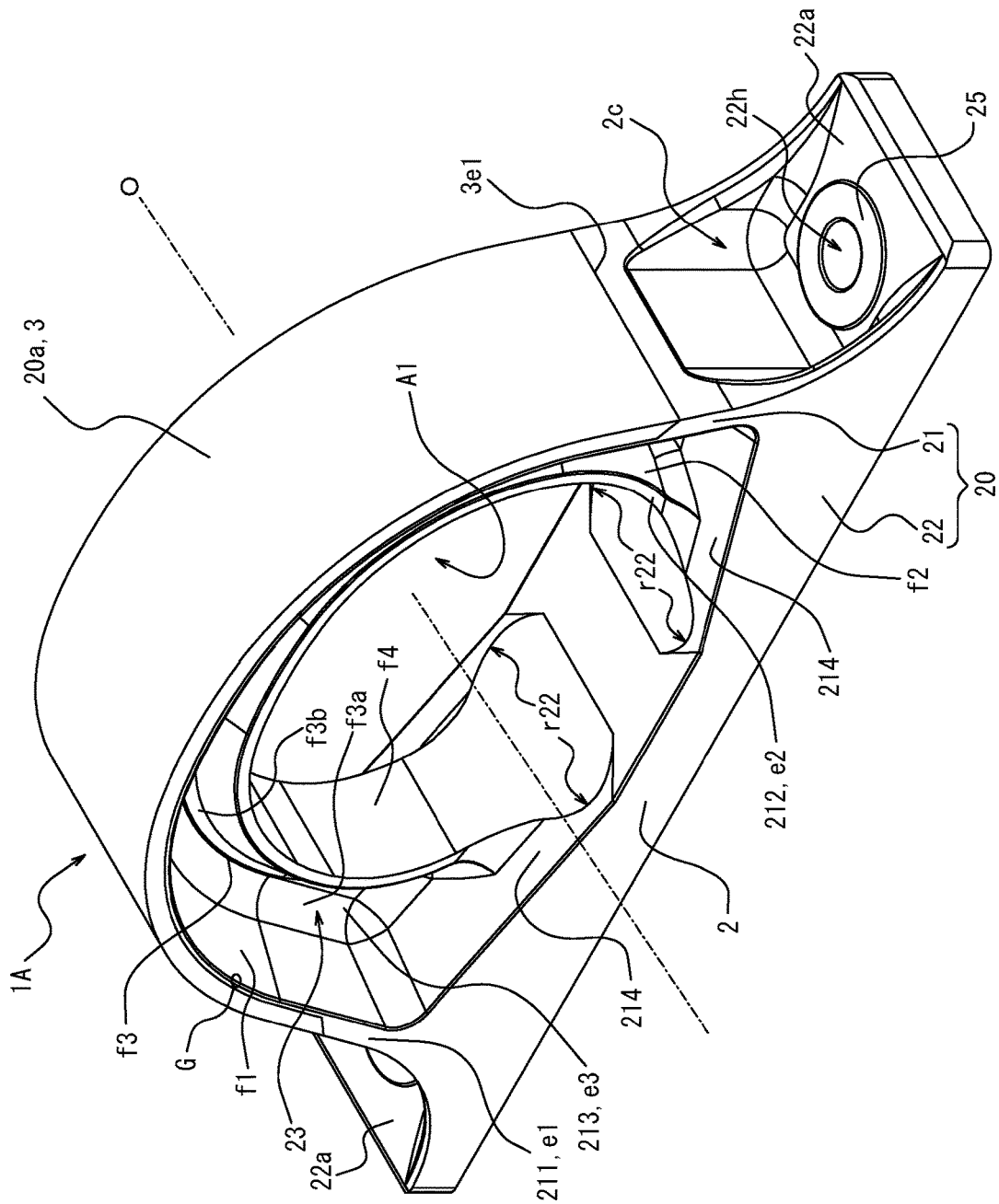
FIG. 8 is a perspective view illustrating FIG. 1 from a front right side.

Referring to FIGS. 7 and 8, in the present embodiment, in the reinforcement member arrangement portion 20a of the surrounding portion 20 of the bracket body 2, the reinforcement member 3 covers an outer circumferential surface of the outer circumference 211 of the reinforcement member arrangement portion 20a. Thereby, in the present embodiment, the reinforcement member 3 forms an outer circumferential surface of the bracket 1 in the reinforcement member arrangement portion 20a of the bracket body 2.

Such a bracket for an anti-vibration device accommodates the main body of the anti-vibration device in the through hole A1 formed by the surrounding portion 20. Therefore, stress is easily concentrated at the surrounding portion 30.

In contrast, as conventional brackets for anti-vibration devices, there is a type in which a reinforcement member formed of a fiber reinforced plastic is fixed onto an outer circumference of a surrounding portion of a bracket body made of a synthetic resin, for the purpose of achieving both weight reduction and durability improvement.

However, in the above conventional brackets for anti-vibration devices, the cross sectional shape of the surrounding portion is rectangular when viewed in cross section perpendicular to the surrounding direction. Therefore, there is room for improvement in the above conventional brackets for anti-vibration devices in terms of securing durability while further reducing weight, or, from another viewpoint, in terms of not increasing weight while further improving durability.

On the other hand, according to the bracket 1A, as illustrated in FIG. 2, in the surrounding portion 20 of the bracket body 2, the reinforcement member arrangement portion 20a of the surrounding portion 20 is formed of the outer circumference 211 extending in the surrounding direction, the inner circumference 212 extending in the surrounding direction, and the connecting portion 213 that connects the outer circumference 211 and the inner circumference 212 while extending in the surrounding direction.

In addition, in the bracket body 2, as illustrated in FIG. 3, when the reinforcement member arrangement portion 20a is viewed in cross section perpendicular to the surrounding direction, the reinforcement member arrangement portion 20a is in the shape of a letter I in cross section in which the cross sectional width W3 of the connecting portion 213 is narrower than the cross sectional width W1 of the outer circumference 211 and the cross sectional width W2 of the inner circumference 212. In other words, in the bracket 1A, the cross sectional shape of the reinforcement member arrangement portion 20a of the surrounding portion 20 of the bracket body 2 is in the shape of a rail in a train track or the like.

According to the bracket 1A, the cross sectional shape of the reinforcement member arrangement portion 20a of the bracket body 2 is in the shape of a letter I. This reduces the amount of a resin used compared to the conventional brackets in which the surrounding portion is in a rectangular shape in cross section. This makes the bracket body 2 lighter than the conventional resin brackets.

According to the bracket 1A, the cross sectional shape of the reinforcement member arrangement portion 20a of the bracket body 2 is in the shape of a letter I, and the length of the connecting portion 213 in the axial perpendicular direction is secured, thereby ensuring large cross sectional shape of the reinforcement member arrangement portion 20a in the axial perpendicular direction, at the center of the reinforcement member arrangement portion 20a of the bracket body 2 in a cross sectional width direction (axial direction). This can increase the strength and rigidity of the bracket body 2. Furthermore, according to the bracket 1A, the reinforcement member arrangement portion 20a of the bracket body 2 is in the shape of a letter I in cross section, and the cross sectional width W1 of the outer circumference 211 and the cross sectional width W2 of the inner circumference 212 are wide. This allows the bracket body 2 to have a large load-bearing area. This allows a load received by the bracket body 2 to be distributed in the cross sectional width direction. Therefore, the bracket body 2 can achieve further improvement in durability, compared to the conventional resin brackets in which the surrounding portion is in a rectangular shape in cross section.

Therefore, according to the bracket 1A, due to the I-shaped cross section of the reinforcement member arrangement portion 20a, it possible to further reduce weight and ensure durability. From another viewpoint, according to the bracket 1A, it is possible to further improve durability without increasing weight.

In the bracket 1A, the cross sectional width W2 of the inner circumference 212 is narrower than the cross sectional width W1 of the outer circumference 211. In this case, the weight can be further reduced as much as the cross sectional width W2 of the inner circumference 212 is narrowed.

In the bracket 1A, the side surfaces f3 of the connecting portion 213 each include the outer circumferential-side curved surface f3a formed of the inwardly concave curve and the inner circumferential-side curved surface f3b formed of the inwardly concave curve. In this case, the concentration of stress that occurs in the bracket body 2 at the time of load input is reduced, thereby improving durability.

In the bracket 1A, the inner circumferential-side surface f1 of the outer circumference 211, the outer circumferential-side surface f2 of the inner circumference 212, and the side surfaces f3 of the connecting portion 213 form the recess 23 extending in the surrounding direction, in the reinforcement member arrangement portion 20a of the surrounding portion 20. In this case, manufacturing quality can be easily ensured.

Providing a walled portion, such as ribs for reinforcement, in the surrounding portion 20 allows reinforcement of the surrounding portion 20.

However, when the surrounding portion 20 is provided with the walled portion, merging and separation of a resin flow are likely to occur during injection molding. Therefore, in this case, it is necessary to prevent the occurrence of weld lines, which may occur in a product, or control the weld lines to be less noticeable, making it difficult to ensure manufacturing quality.

In contrast, in the bracket 1A, the recess 23 is formed of the inner circumferential-side surface f1 of the outer circumference 211, the outer circumferential-side surface f2 of the inner circumference 212, and the side surfaces f3 of the connecting portion 213, and there is no walled portion. In this case, a load-bearing area of the inner circumference 212 that receives a load from the main body of the anti-vibration device is secured, and the area of the outer circumference 211 at which stress is generated is increased. Furthermore, the cross sectional area of the connecting portion 213 can be reduced. As a result, a resin flow become uniform during the injection molding of the bracket 1A, making it easier to apply the reinforcement member 3, while reducing the weight of a product (no wasted wall). Therefore, according to the bracket 1A, manufacturing quality can be easily ensured.

The bracket 1A can have an injection-molded gate mark G on the inner circumferential-side surface f1 of the outer circumference 211. In this case, the reinforcement member 3 is firmly fixed to the bracket body 2 without impairing an appearance.

A molding method for the bracket 1A includes, for example, so-called hybrid molding in which the reinforcement member 3 is injection-molded together with the bracket body 2, as an insert.

However, in such hybrid molding, the synthetic resin supplied into a mold may unintentionally flow into the side of the outer circumferential surface of the reinforcement member 3. This flow of the synthetic resin may impair an appearance of the outer circumferential surface of the reinforcement member 3 when a product is completed. On the other hand, to prevent the flow of the synthetic resin, it is conceivable to position an injection molding gate far from the reinforcement member 3 in the mold. However, in this case, since the synthetic resin is molded from a position far from the reinforcement member 3 in the mold, pressure to adhere the synthetic resin to the reinforcement member 3 may be insufficient.

In contrast, for example, referring to FIG. 3, in the bracket 1A, the gate mark G is formed in the bracket body 2, on the inner circumferential-side surface f1 of the outer circumference 211. In other words, when the bracket 1A is injection molded together with the bracket body 2 with the reinforcement member 3 as an insert, the synthetic resin is supplied into the mold from the inner circumferential surface of the reinforcement member 3. In this way, by supplying the synthetic resin from the inner circumferential surface of the reinforcement member 3, the resin is prevented from flowing into the outer circumferential surface of the reinforcement member 3. Also, in this case, the synthetic resin is injected from a position close to the reinforcement member 3 in the mold, thereby increasing pressure to adhere the synthetic resin to the reinforcement member 3.

In particular, in the bracket 1A, the gate mark G is formed in a region that includes an axial corner 2e of the outer circumference 211. The axial corner 2e of the outer circumference 211 is a portion at which the axial end e1 and the inner circumferential-side surface f1 of the outer circumference 211 are connected. In other words, the synthetic resin is supplied into the mold from an inner circumferential surface side of the reinforcement member 3, in the vicinity of the axial end 3e3 of the reinforcement member 3. In this case, the synthetic resin is supplied so as to press the axial end 3e3 of the reinforcement member 3 against the mold, so the resin is effectively prevented from flowing into the outer circumferential surface of the reinforcement member 3.

Furthermore, in the bracket 1A, the gate mark G extends from the axial corner 2e of the outer circumference 211, along the axial end e1, to the boundary between the bracket body 2 and the reinforcement member 3 (an outer circumferential surface 2f of the outer circumference 211 (bracket body 2)). In other words, the synthetic resin in the mold is, at a position closest to the axial end 3e3 of the reinforcement member 3, supplied so as to press the axial end 3e3 of the reinforcement member 3 against the mold at a certain input angle (an acute angle exceeding 0 degrees, except for 90 degrees) with respect to the inner circumferential surface of the reinforcement member 3. In this case, the synthetic resin is injected from an inner circumferential side of the outer circumference 211 immediately close to the reinforcement member 3, so it is possible to further prevent the resin from flowing into the outer circumferential surface of the reinforcement member 3.

Figure 9:
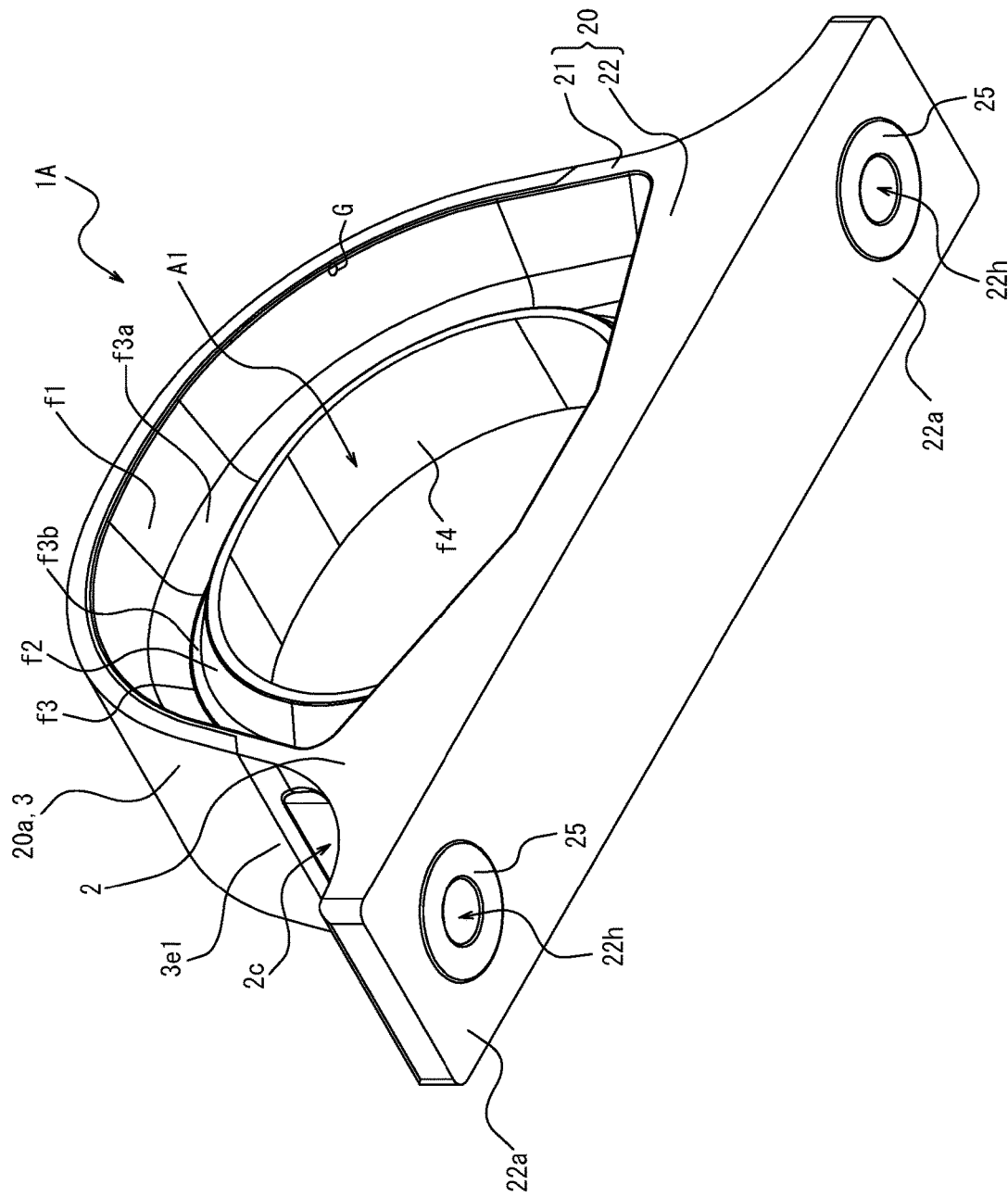
FIG. 9 is a perspective view illustrating FIG. 1 from a bottom left side.
Figure 10:
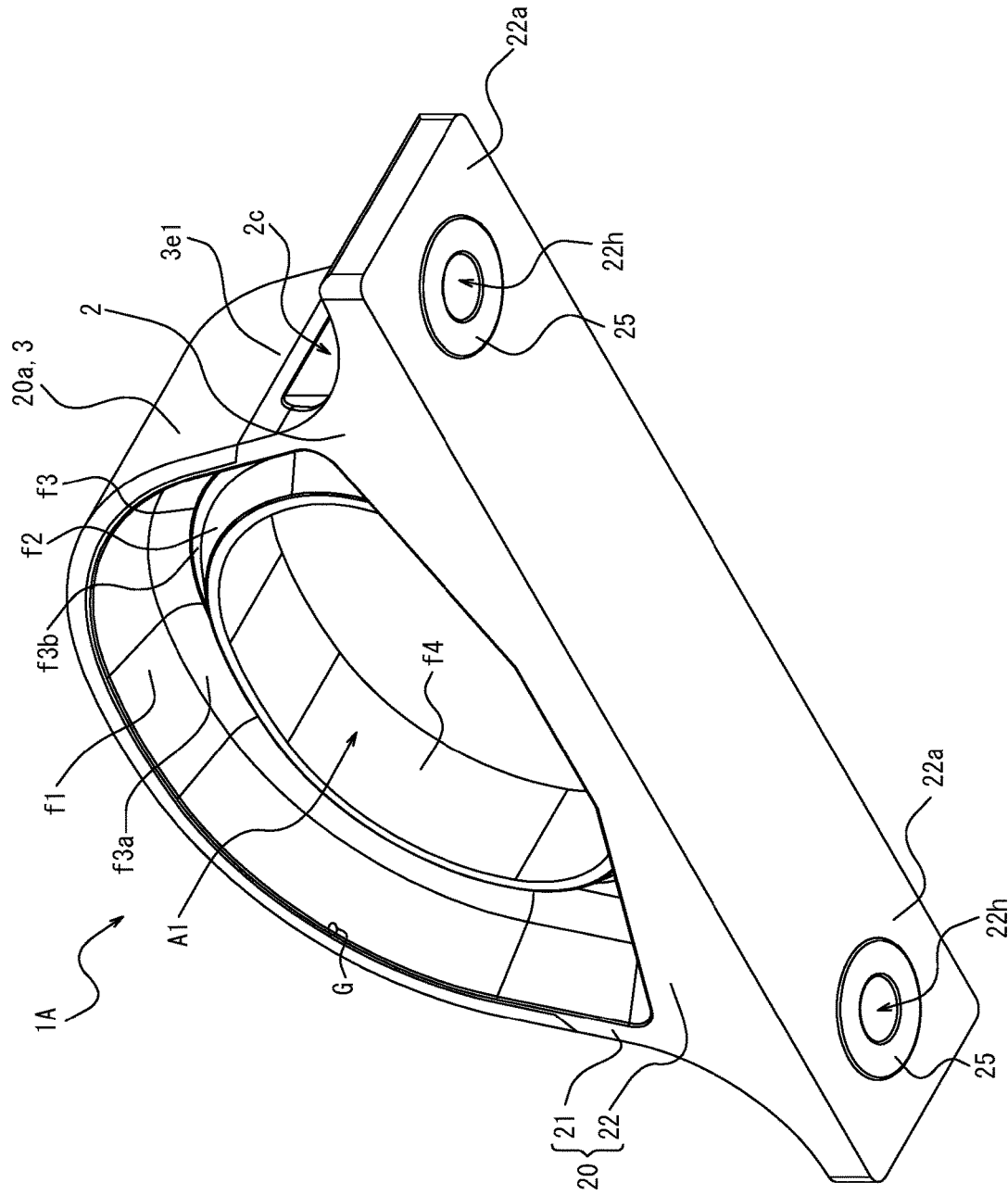
FIG. 10 is a perspective view illustrating FIG. 1 from a bottom right side.
Figure 11:
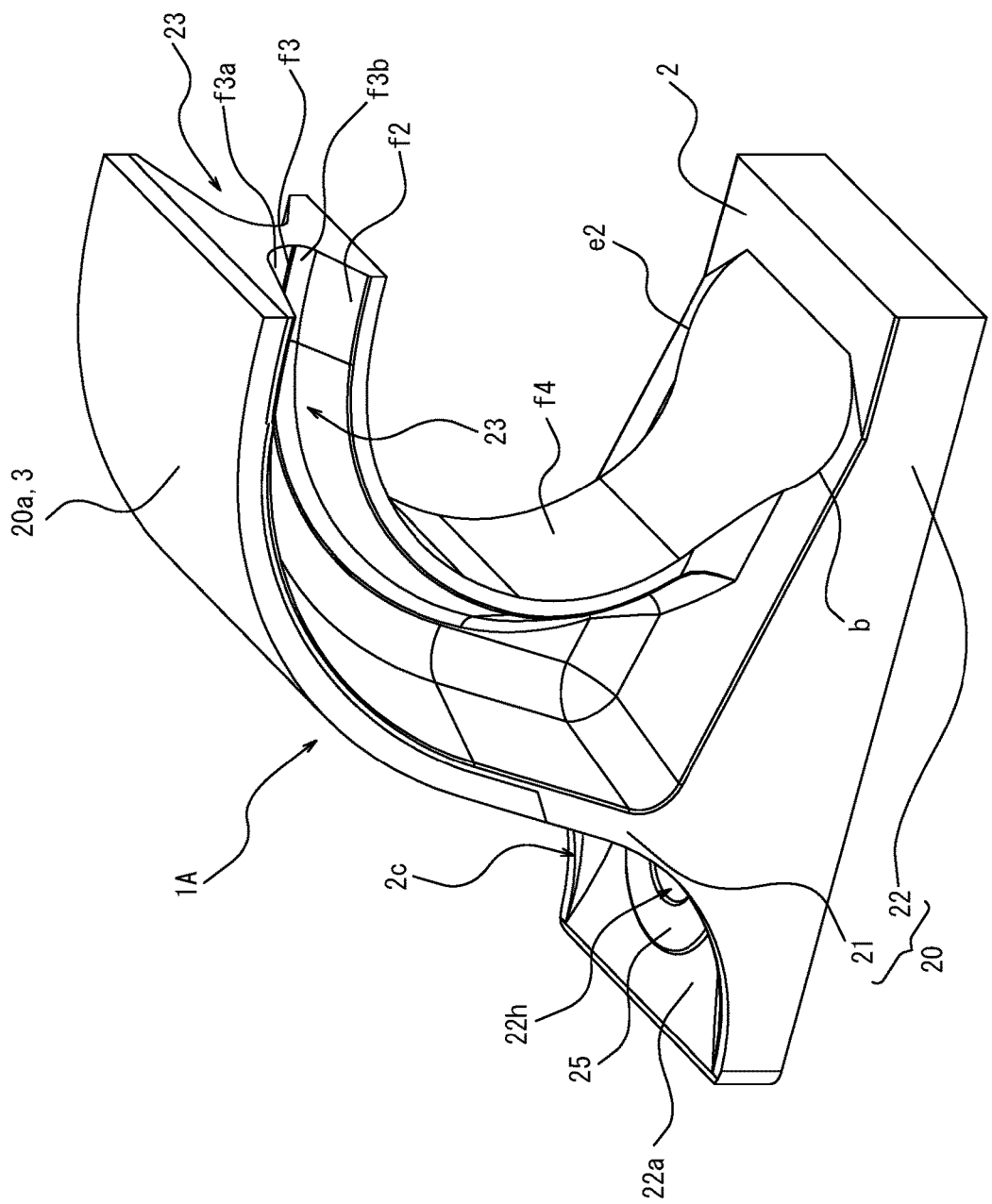
FIG. 11 is a perspective view illustrating A-A cross section of FIG. 1 from a right front plane side.

Referring to FIGS. 9 and 10, gate marks G are formed on both sides in the axial direction. However, the gate mark G may be formed on at least either one side in the axial direction or the other side in the axial direction. In the present embodiment, the gate marks G are formed on both sides in the left and right directions at the time of mounting the bracket 1A on the vehicle. In addition, one gate mark G is formed on each of the one side in the axial direction and the other side in the axial direction. However, at least one gate mark G can be formed on at least one of the one side in the axial direction or the other side in the axial direction. In the present embodiment, the gate marks G are formed one on each side in the left and right directions at the time of mounting the bracket 1A on the vehicle, respectively, in the rear direction at the time of mounting the bracket 1A on the vehicle. FIG. 11 is a perspective view illustrating A-A cross section of FIG. 1 from a right front plane side. According to FIG. 11, when the A-A cross section of FIG. 2 is viewed from above at the time of mounting the bracket 1A on the vehicle, no gate marks G are seen as illustrated in FIG. 11.

Figure 12:
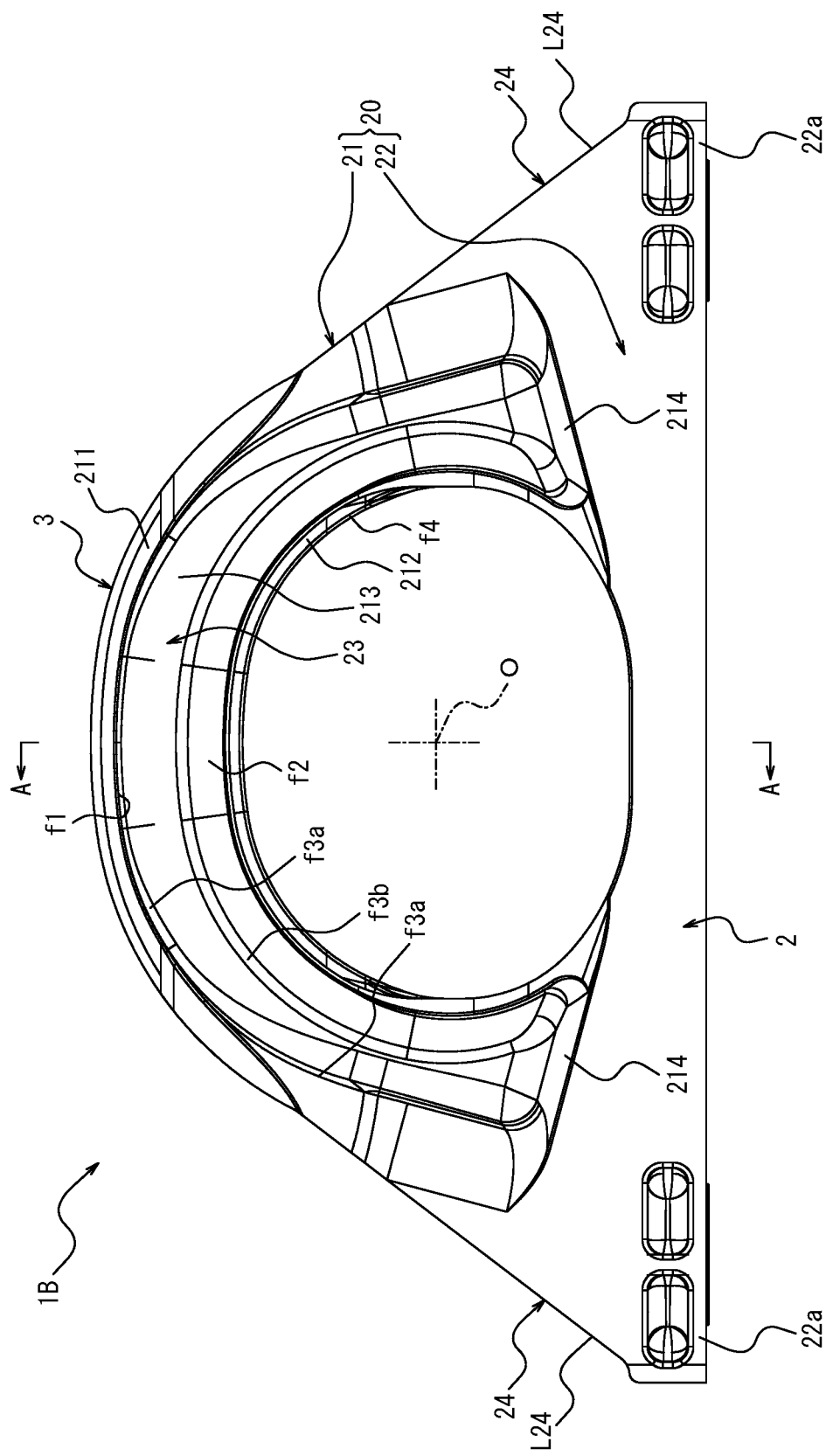
FIG. 12 is a front view of a bracket for an anti-vibration device according to a second embodiment.

FIG. 12 is a front view of a bracket 1B (also referred to simply as "bracket 1B") according to a second embodiment.

The bracket 1B, as with the bracket 1A, includes a bracket body 2 made of a synthetic resin and a reinforcement member 3 made of a fiber reinforced plastic.

Figure 13:
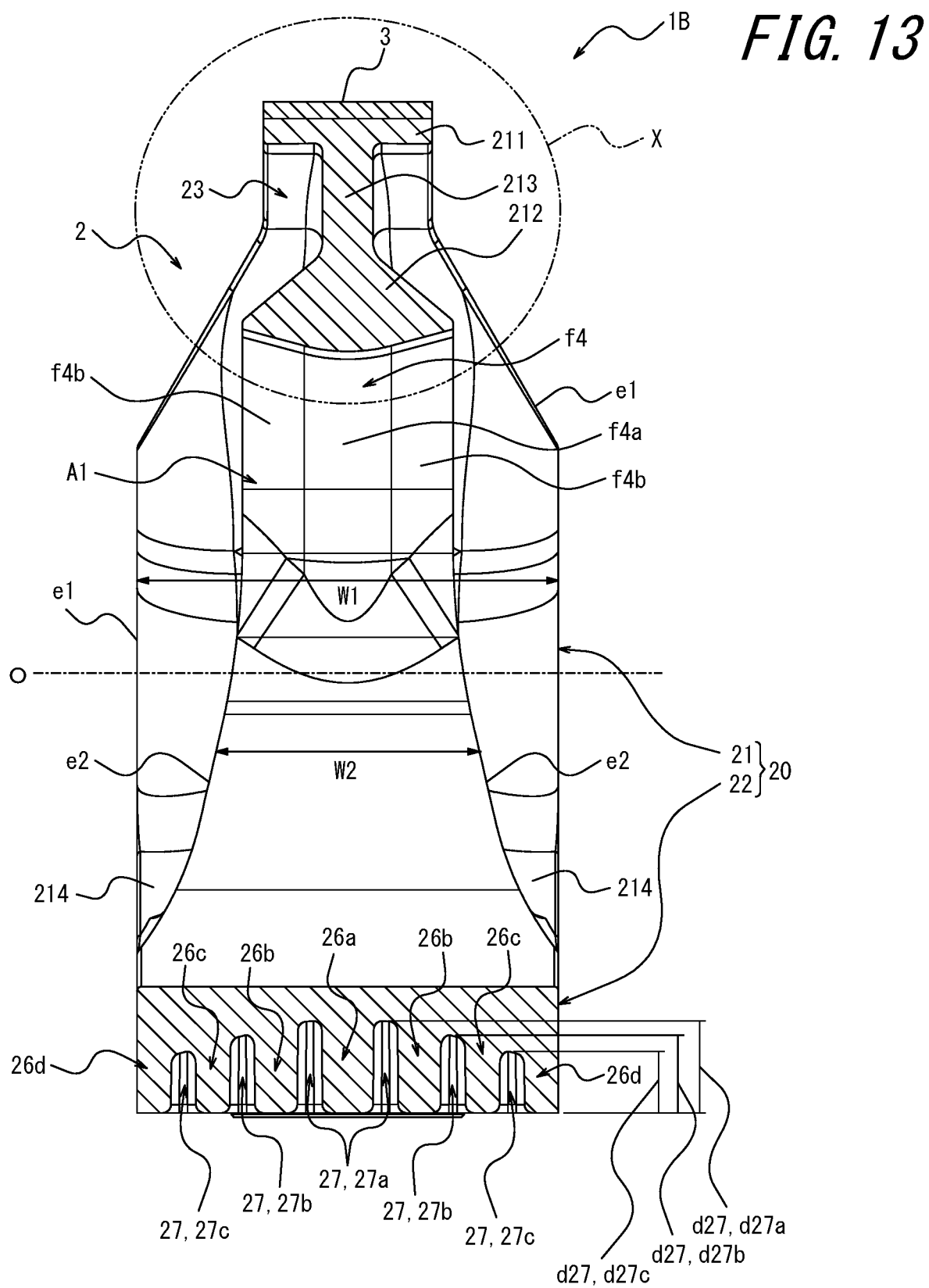
FIG. 13 is an A-A cross sectional view of FIG. 12.

The bracket body 2, as with the bracket 1A, has a surrounding portion 20, and the surrounding portion 20 has a first surrounding portion 21 and a second surrounding portion 22. Referring to FIG. 13, in the present embodiment, the first surrounding portion 21, as with the bracket 1A, is formed of an outer circumference 211 extending in a surrounding direction, an inner circumference 212 extending in the surrounding direction, and a connecting portion 213 that connects the outer circumference 211 and the inner circumference 212 while extending in the surrounding direction.

Figure 14:
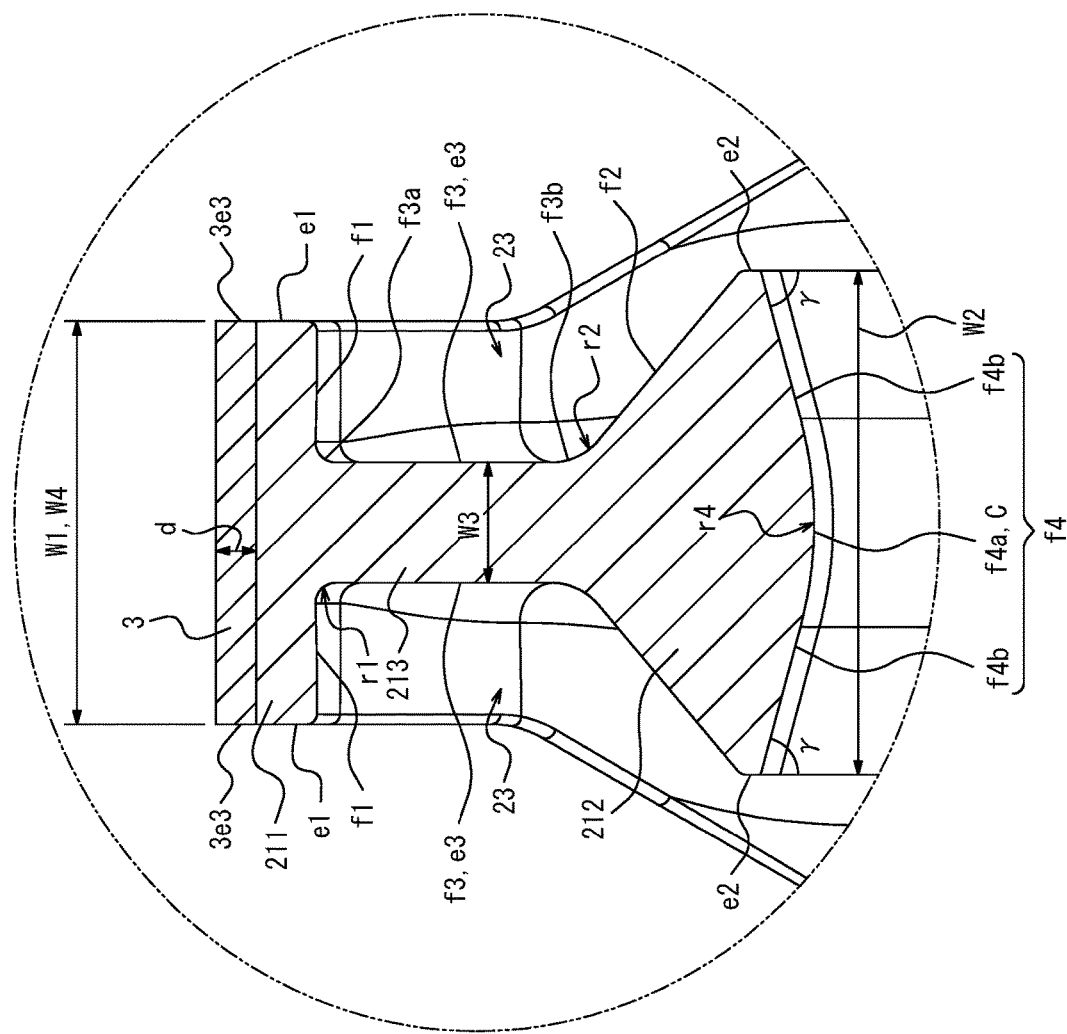
FIG. 14 is an enlarged view of FIG. 13.

On the other hand, according to the present disclosure, the cross sectional width W1 of the outer circumference 211 can be the same as or narrower than the cross sectional width W2 of the inner circumference 212. Referring to FIG. 14, in the present embodiment, the cross sectional width W1 of the outer circumference 211 is narrower than the cross sectional width W2 of the inner circumference 212.

When the cross sectional width W1 of the outer circumference 211 is the same as or narrower than the cross sectional width W2 of the inner circumference 212, the bracket 1B is designed with emphasis on the strength and rigidity of the inner circumference 211, which directly receives a load from the main body of the anti-vibration device, so a strength and rigidity balance between the outer circumference 211 and the inner circumference 212, as a whole of the bracket body 2, becomes good. Therefore, according to the bracket 1B, the strength balance between the outer circumference 211 and inner circumference 212 is good. Therefore, according to bracket 1B, while maintaining a good strength balance between the outer circumference 211 and the inner circumference 212, it is possible to further reduce weight and improve durability. Specifically, when the cross sectional width W1 of the outer circumference 211 is the same as or narrower than the cross sectional width W2 of the inner circumference 212, for example, a fracture starting point of the bracket body 2, as a whole, can be made uniform, and the uniform fracture starting point facilitates effectively using the reinforcement member 3 for the bracket body 2. In addition, according to the present embodiment, the strength and rigidity balance between the outer circumference 211 and the inner circumference 212 is good, so the thickness d of the reinforcement member 3 can be made thinner than that of the bracket 1A.

Referring to FIG. 14, in the present embodiment, an inner circumferential-side surface f4 of the inner circumference 212 has an outline convex toward an inner circumferential side in the axial cross sectional view (i.e., when viewed in cross section perpendicular to the surrounding direction).

The inner circumferential-side surface f4 of the inner circumference 212 is an attachment surface of the main body of the anti-vibration device. Loads from various directions are applied to the main body of the anti-vibration device. In addition, a connecting portion 213 is connected to the inner circumference 212 at the center in a cross sectional width direction (axial direction). Therefore, due to load input from the main body of the anti-vibration device (for example, by contact between the main body of the anti-vibration device and the inner circumference 212), the load input is concentrated at, of the inner circumference 212, portions on the sides of axial ends e2 of the inner circumference 212 in a vertical direction at the time of mounting the bracket 1B on the vehicle, there is concern that the portions on the sides of the axial ends e2 of the inner circumference 212 may be displaced. Therefore, such concentration of the load input can be one of major fracture models of the bracket and should be prevented.

Referring to FIG. 14, in the present embodiment, the shape of the inner circumferential-side surface f4 of the inner circumference 212 is convex inwardly in the axial cross sectional view. Thereby, according to the present embodiment, the concentration of the load input that may occur when loads are input can be prevented. Therefore, according to the present embodiment, durability can be further improved.

Also, referring to FIG. 14, in the present embodiment, of the convex outline, an axial central portion f4*a* of the inner circumferential-side surface f4 is formed with an outwardly convex curve C. In the present embodiment, the curve C is an arc curve with a radius of curvature r4.

In the bracket 1B, the axial central portion f4*a* of the inner circumferential-side surface f4 is a portion with the largest load input. Therefore, by forming the axial central portion f4*a* of the inner circumferential-side surface f4 with the outwardly convex curve C, it is possible to alleviate stress concentration that occurs at the axial central portion f4*a* of the inner circumferential-side surface f4. Therefore, according to the present embodiment, durability can be further improved.

According to the present disclosure, the overall axial shape of the inner circumferential-side surface f4 of the inner circumference 212 can be formed with the one curve C described above, or a combination of the one curve C and a plurality of curves.

In contrast, referring to FIG. 14, in the present embodiment, of the convex outline, axial end portions f4*b* (more specifically, both end portions f4*b* and *f*4*b*) of the inner circumferential-side surface f4 are formed with straight lines L. In the present embodiment, the straight lines L are connected to the axial central portion f4*a* of the inner circumferential-side surface f4 at an acute angle γ with respect to the axial perpendicular direction. In this case, further weight reduction can be achieved. According to the present disclosure, the axial central portion f4a of the inner circumferential-side surface f4 can be formed with one or more straight lines, one or more curves, or a combination thereof (except, however, with only one straight line).

Furthermore, in the present embodiment, as with the bracket 1A, the inner circumferential-side surface f1 of the outer circumference 211, the outer circumferential-side surface f2 of the inner circumference 212, and side surfaces f3 of the connecting portion 213 form the recess 23 extending in the surrounding direction, in a reinforcement member arrangement portion 20a of the surrounding portion 20.

Referring back to FIG. 12, in the present embodiment, as with the bracket 1A, the recess 23 is formed of the outer circumference 211, the inner circumference 212, the connecting portion 213, and surrounding directional end surfaces 214. Furthermore, referring to FIG. 13, in the present embodiment, the surrounding directional end surfaces 214 are connected to through holes A1. Thereby, in the present embodiment, as with the bracket 1A, the recess 23 is open to the through holes A1 at ends in the surrounding direction.

Referring to FIG. 13, in the present embodiment, in an upper portion of the surrounding portion 20 (a bridge of the first surrounding portion 21), the cross sectional width W2 of the inner circumference 212 is basically constant from an upper direction to a lower direction at the time of mounting the bracket 1B on the vehicle. However, in the present embodiment, as illustrated in FIG. 13, the cross sectional width W2 of the inner circumference 212 widens from the central axis O toward the second surrounding portion 22. The cross sectional width W2 has its maximum width in the vicinity of the second surrounding portion 22. Also, referring to FIG. 13, in the present embodiment, in the upper portion of the surrounding portion 20 (bridge of the first surrounding portion 21), the cross sectional width W1 of the outer circumference 211 is basically constant from the upper direction to the lower direction at the time of mounting the bracket 1B on the vehicle. However, in the present embodiment, as illustrated in FIG. 13, the cross sectional width W1 of the outer circumference 211 widens from a predetermined position of the connecting portion 213 to the central axis O. Furthermore, in the present embodiment, as illustrated in FIG. 13, the cross sectional width W1 of the outer circumference 211 has a constant width (maximum width of the cross sectional width W1) from a predetermined position above the central axis O in the upper direction at the time of mounting the bracket 1B on the vehicle, toward the second surrounding portion 22.

In the present embodiment, as with the bracket 1A, the surrounding portion 20 of the bracket body 2 is reinforced by disposition of the reinforcement member 3. In the present embodiment, as with the bracket 1A, the reinforcement member 3 is made of a fiber reinforced plastic (FRP).

Figure 15:
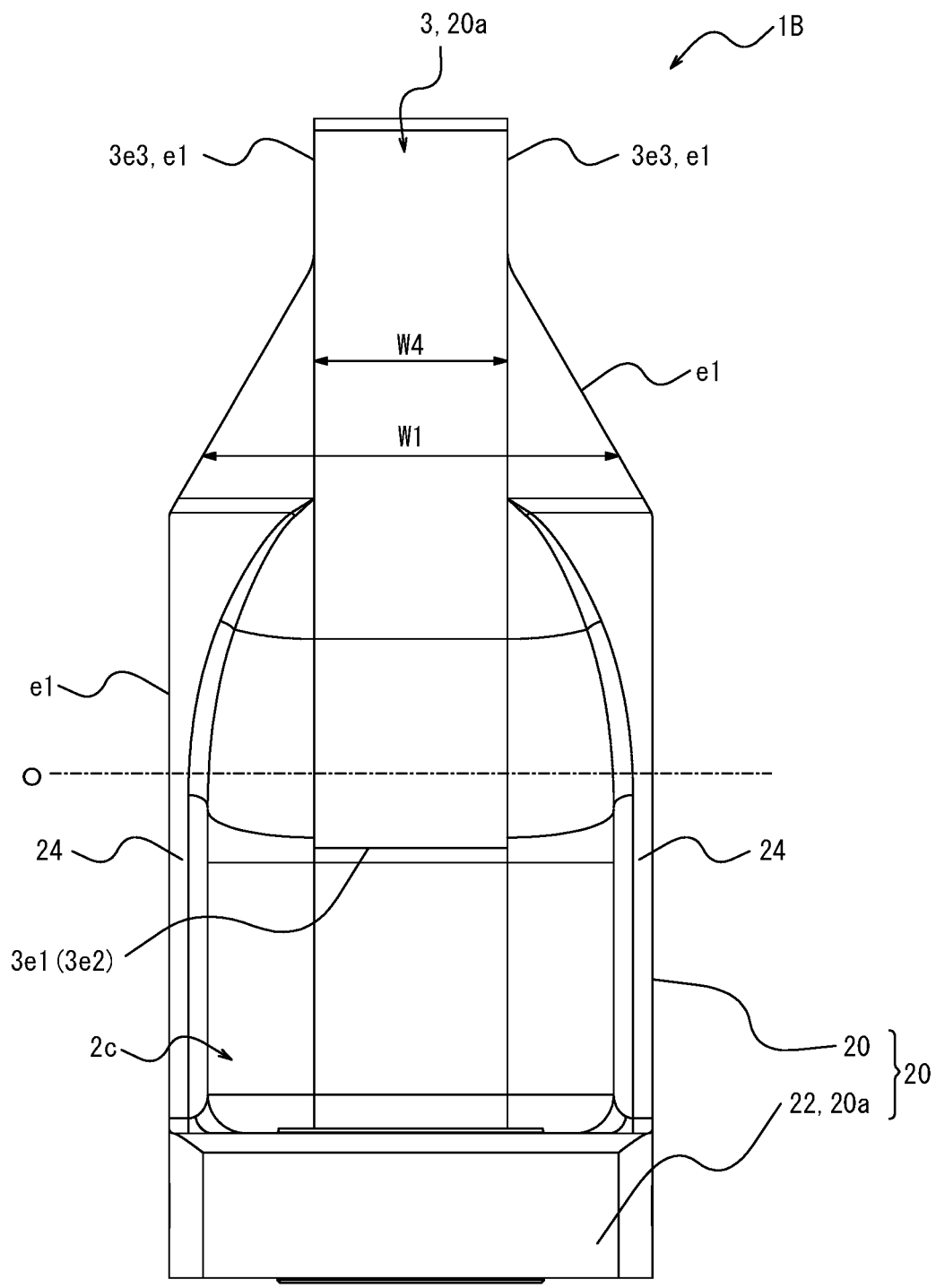
FIG. 15 is a left side view of FIG. 12.

Referring to FIG. 14, in the present embodiment, the cross sectional width W4 of the reinforcement member 3 is the same as the cross sectional width W1 of the outer circumference 211 in the upper portion of the surrounding portion 20 (bridge of the first surrounding portion 21). The cross sectional width W4 of the reinforcement member 3 is equal to the width between axial ends 3e3 of the reinforcement member 3. Referring to FIG. 15, in the present embodiment, as with the bracket 1A, the cross sectional width W4 of the reinforcement member 3 is constant along the surrounding direction. However, in the present embodiment, as described above, in the first surrounding portion 21, the cross sectional width W1 of the outer circumference 211 widens along the surrounding direction from a position at a certain distance from the second surrounding portion 22, toward the second surrounding portion 22. The cross sectional width W1 has its maximum width in the vicinity of the second surrounding portion 22.

By the way, when the surrounding portion 20 is loaded in a lateral direction (for example, in the front-back direction at the time of mounting the bracket 1A or 1B on the vehicle), the load is concentrated at a portion at which the lateral width of the through hole A1 is maximized, in the present embodiment, at a part of the first surrounding portion 21 located at the height of the central axis O in the vertical direction at the time of mounting the bracket 1A or 1B on the vehicle. On the other hand, both the ends 3e1 and 3e2 of the reinforcement member 3 in the extending direction are the boundary between the reinforcement member 3 and the bracket body 2, which are made of different materials. Therefore, when the surrounding portion 20 is subjected to a large load in the lateral direction, stress concentration may occur at both the ends 3e1 and 3e2 of the reinforcement member 3 in the extending direction. Therefore, both the ends 3e1 and 3e2 of the reinforcement member 3 in the extending direction are preferably located below the height of the central axis O at which the lateral width of the through hole A1 is maximized (a side closer to the second surrounding portion 22).

For example, referring to FIG. 4, in the bracket 1A, the reinforcement member 3 extends closer to a lower portion (the second surrounding portion 22) of the surrounding portion 20, with respect to the bracket 1A. Therefore, according to the bracket 1A, both the ends 3e1 and 3e2 of the reinforcement member 3 in the extending direction are located below the height of the central axis O at which the lateral width of the through hole A1 is maximized, so that the stress concentration that may occur at both the ends 3e1 and 3e2 in the extending direction can be reduced. Therefore, according to the bracket 1A, durability can be further improved.

On the other hand, for the reinforcement member 3, since the cross sectional width W1 of the outer circumference 211 is narrower than the cross sectional width W2 of the inner circumference 212, the cross sectional width W4 of the reinforcement member 3 can be narrower than that in the bracket 1A. Referring to FIG. 15, in the present embodiment, the reinforcement member 3 can extend to a concavity 2c provided in the bracket body 2 to the extent that the cross sectional width W4 of the reinforcement member 3 is narrower than that in the bracket 1A. In the present embodiment, both the ends 3e1 and 3e2 of the reinforcement member 3 in the extending direction are, as illustrated in FIG. 15, disposed in concavities 2c provided in the bracket body 2. Therefore, according to the present embodiment, the reinforcement member 3 can extend to positions closer to the second surrounding portion 22, compared to the bracket 1A, to the extent that the cross sectional width W4 of the reinforcement member 3 can be narrower than that in the bracket 1A. Therefore, according to the present embodiment, durability can be further improved to the extent that the reinforcement member 3 extends to the positions closer to the second surrounding portion 22 than that in the bracket 1A.

In the present embodiment, as in the bracket 1A, each of the concavities 2c is formed of the second surrounding portion 22 and two ridge ribs 24. On the other hand, in the present embodiment, in the reinforcement member 3, the cross sectional width W1 of the outer circumference 211 is narrower than the cross sectional width W2 of the inner circumference 212, as described above. Therefore, according to the present embodiment, the reinforcement member 3 can be located between the two ridge ribs 24, as described above. In other words, according to the present embodiment, the two ridge ribs 24 can extend in the upward direction at the time of mounting the bracket 1B on the vehicle, without interfering with the reinforcement member 3. For example, referring to FIG. 1, in the bracket 1A, ridge lines L24 of the two ridge ribs 24 are inwardly concave curves. In contrast, referring to FIG. 15, in the present embodiment, ridge lines L24 of the two ridge ribs 24 are straight lines. In other words, in the present embodiment, regions of the ridge ribs 24 are enlarged compared to those in the bracket 1A. Therefore, according to the present embodiment, durability can be further improved to the extent that the regions of the ridge ribs 24 are enlarged compared to those in the bracket 1A.

Figure 16:
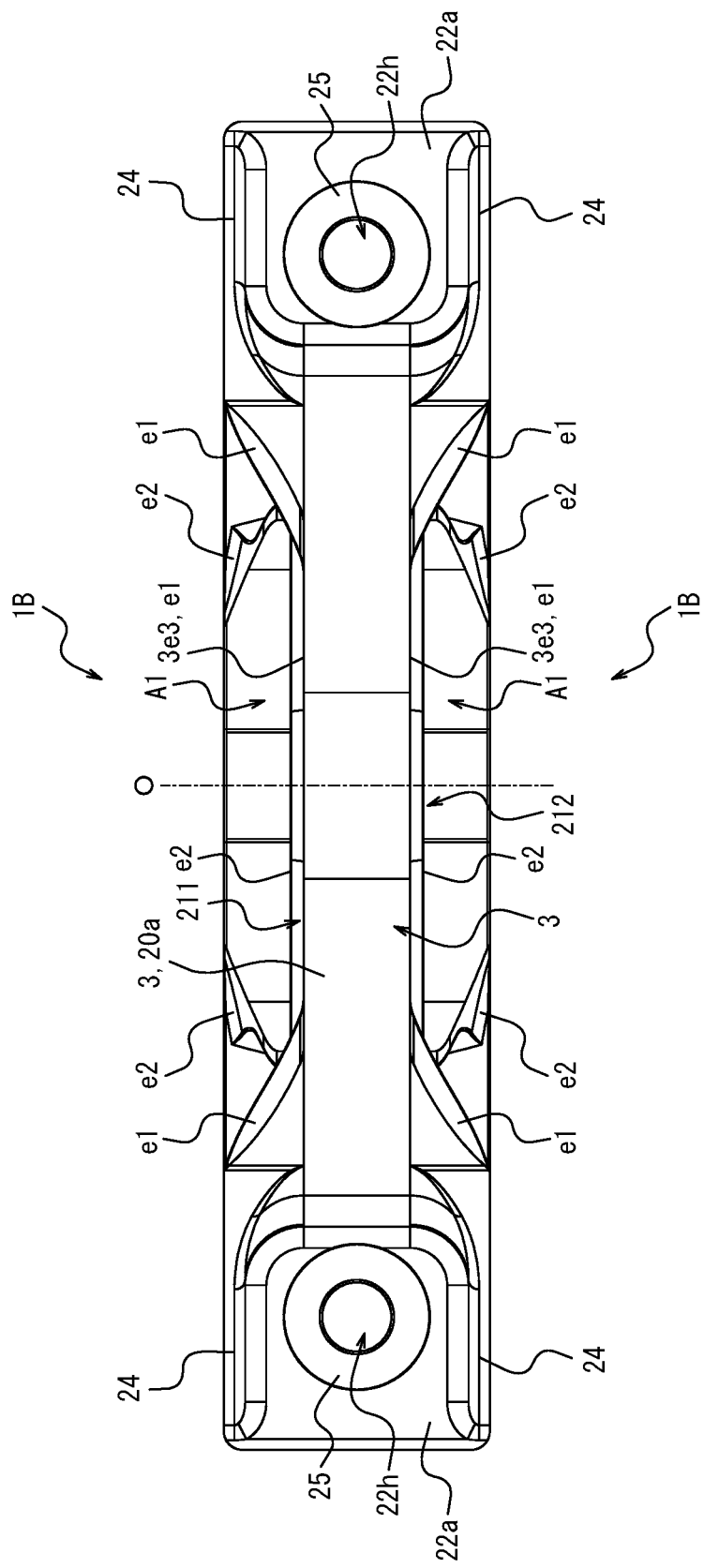
FIG. 16 is a plan view of FIG. 12.

By the way, referring to FIG. 16, as with the bracket 1A, the bracket 1B has anchors 25 in the bracket body 2, and is connected to an engine or the like by means of fastener elements (for example, bolts) through fixing holes 22h of the anchors 25.

Figure 17:
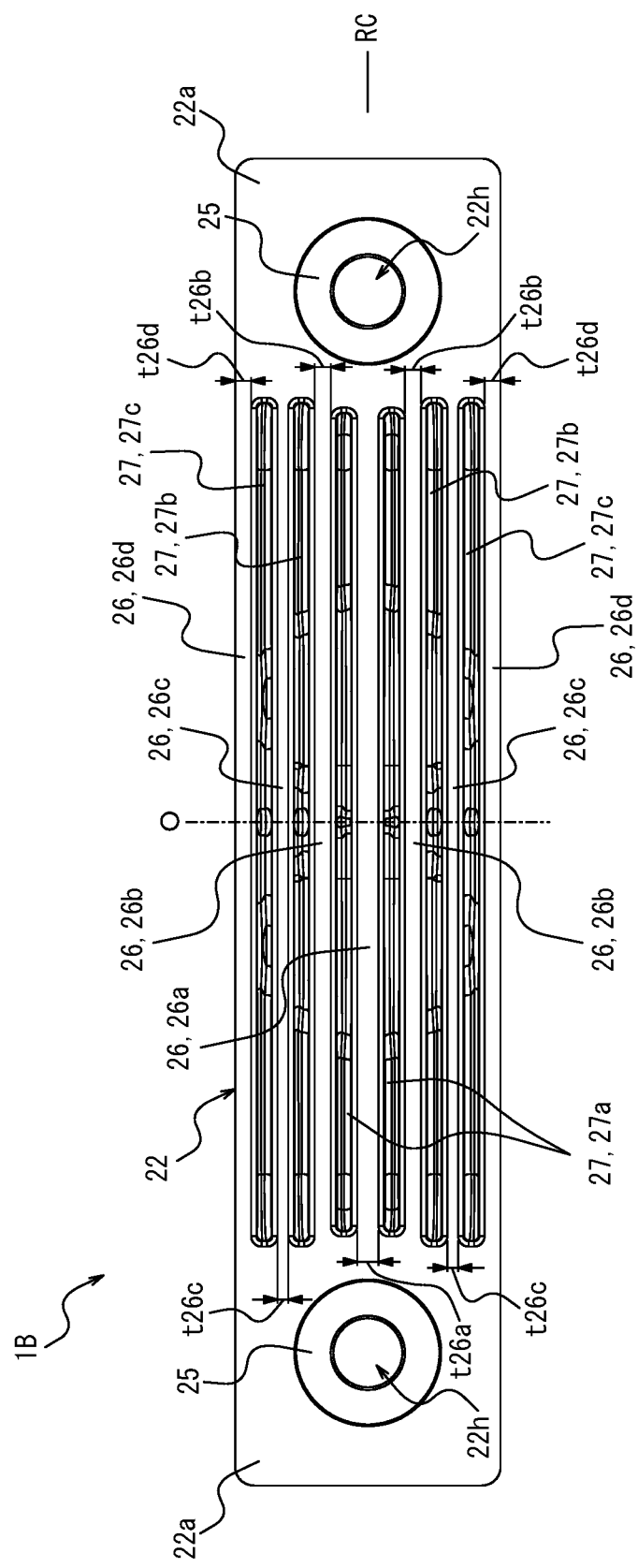
FIG. 17 is a bottom view of FIG. 12.

On the other hand, referring to FIG. 17, in the present embodiment, the bottom of the bracket body 2 has a plurality of bottom ribs 26 that extend in the axial perpendicular direction and are arranged at intervals in the axial direction. The thickness t26 of the plurality of bottom ribs 26 is thicker the closer the bottom ribs 26 are to the center in the axial direction. In this case, weight reduction can be further improved.

Referring to FIG. 17, the symbol RC indicates a central region (hereinafter also referred to as "left-right central region") between the anchors 25 in the left-right direction at the time of mounting the bracket 1B on the vehicle. When the bracket 1B is mounted and used on a vehicle body, there is concern that a large load may be applied to the left-right central region RC.

Referring to FIG. 17, in the present embodiment, in a bottom surface of the second surrounding portion 22, seven bottom ribs 26, that is, a central bottom rib (first bottom rib) 26a, two second bottom ribs 26b, two third bottom ribs 26c, and two fourth bottom ribs 26d are formed. In the present embodiment, the central bottom rib 26a extends in the axial perpendicular direction (vertical direction at the time of mounting the bracket 1B on the vehicle) along the left-right central region RC. The two second bottom ribs 26b are, with respect to the central bottom rib 26a, arranged outwardly in the axial direction (left-right direction at the time of mounting the bracket 1B on the vehicle) and spaced apart in the axial direction. The two third bottom ribs 26c are, with respect to the second bottom ribs 26b, arranged on the sides of the axial direction (left-right direction at the time of mounting the bracket 1B on the vehicle) and spaced apart in the axial direction. The two fourth bottom ribs 26d are, with respect to the third bottom ribs 26c, arranged on the sides of the axial direction (left-right direction at the time of mounting the bracket 1B on the vehicle) and spaced apart in the axial direction. In the present embodiment, the thickness t26 of the bottom ribs 26 is the thickness (width) in the axial direction (left-right direction at the time of mounting the bracket 1B on the vehicle).

Referring to FIG. 17, the thickness t26a of the central bottom rib 26a is the thickest (widest) of all the bottom ribs 26. The thickness t26b of the second bottom ribs 26b is thinner (narrower) than the thickness t26a of the central bottom rib 26a. The thickness t26c of the third bottom ribs 26c is thinner (narrower) than the thickness t26b of the second bottom ribs 26b. The thickness t26d of the fourth bottom ribs 26d is thinner (narrower) than the thickness t26c of the third bottom ribs 26c. In other words, in the present embodiment, the thickness t26d of the fourth bottom ribs 26d is thinnest of all the bottom ribs 26. According to the present embodiment, while the thickness t26a of the central bottom rib 26a located in the left-right central region RC is ensured to be the thickest, the thickness t26 of the bottom ribs 26 is reduced the farther the bottom ribs 26 are apart from the left-right central region RC, thereby improving weight reduction.

Referring again to FIG. 13, in the present embodiment, in the bottom surface of the bracket body 2, a plurality of bottom grooves 27, which extend in the axial perpendicular direction and are arranged at intervals in the axial direction, are formed. In the present embodiment, the bottom ribs 26 are ribs each formed between the bottom grooves 27. Furthermore, in the present embodiment, the depth of the plurality of bottom grooves 27 is deeper the closer the bottom grooves 27 are the center in the axial direction. In this case, durability can be further improved while weight can be reduced.

Referring to FIG. 13, in the present embodiment, in the bottom surface of the second surrounding portion 22, six bottom grooves 27, that is, two central bottom grooves (first bottom grooves) 27a, two second bottom grooves 27b, and two third bottom grooves 27c are formed. In the present embodiment, the two central bottom grooves 27a form the central bottom rib 26a between the two central bottom grooves 27a. Each of the second bottom grooves 27b forms the second bottom rib 26b between the second bottom groove 27b and the central bottom groove 27a. Each of the third bottom grooves 27c forms the third bottom rib 26c between the third bottom groove 27c and the second bottom groove 27b. Furthermore, each of the third bottom grooves 27c forms the fourth bottom rib 26d outside the third bottom groove 27c in the axial direction (left-right direction at the time of mounting the bracket 1B on the vehicle). In the present embodiment, the depth d26 of the bottom grooves 27 is the depth in the axial perpendicular direction (vertical direction at the time of mounting the bracket 1B on the vehicle).

Referring to FIG. 13, the depth d27a of the two central bottom grooves 27a is the deepest of all the bottom grooves 27. The depth d27b of the second bottom grooves 27b is shallower than the depth d27a of the central bottom grooves 27a. The depth d27c of the third bottom grooves 27c is shallower than the depth d27b of the second bottom grooves 27b. In other words, in the present embodiment, the depth d27c of the third bottom grooves 27c is the shallowest of all the bottom grooves 27. According to the present embodiment, while the depth d27a of the central bottom grooves 27a located in the left-right central region RC is ensured to be the deepest, the depth d26 of the bottom grooves 27 is reduced the farther the bottom grooves 27 are apart from the left-right central region RC, thereby improving durability as well as weight reduction.

Figure 18:
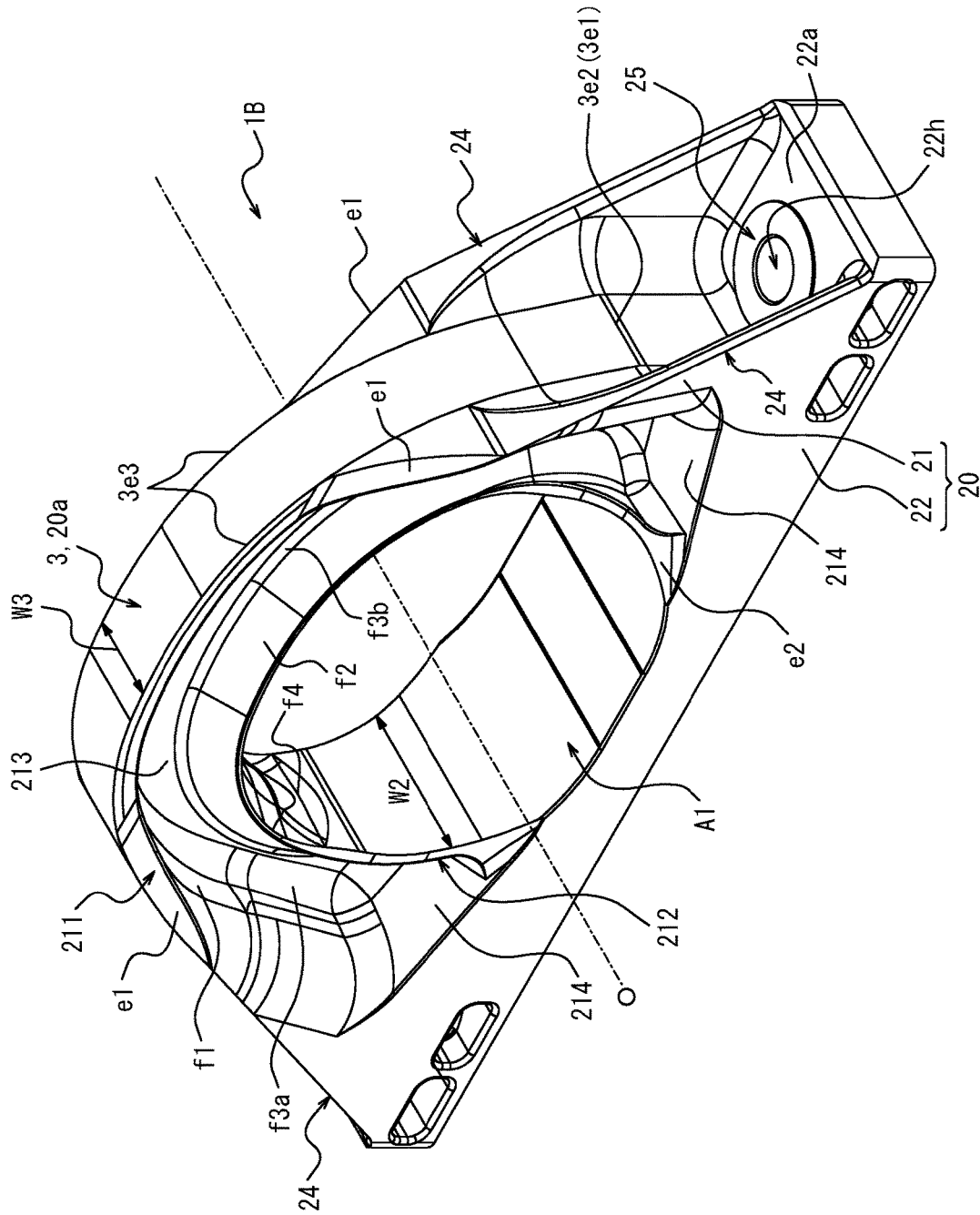
FIG. 18 is a perspective view illustrating FIG. 12 from a front right side.
Figure 19:
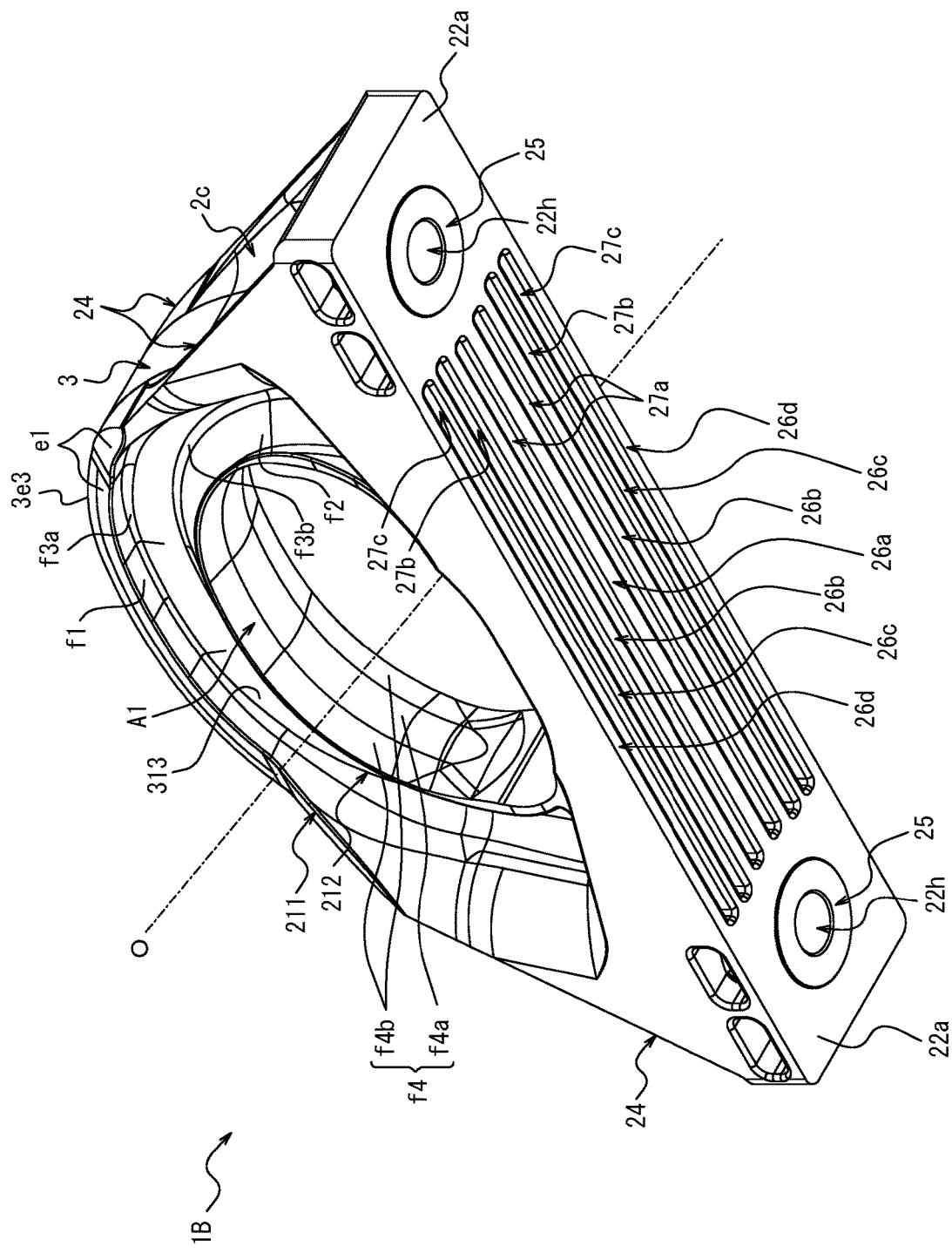
FIG. 19 is a perspective view illustrating FIG. 1 from a bottom right side.

FIG. 18 illustrates the bracket 1B from the front left side. FIG. 19 illustrates the bracket 1B from the bottom left side.

The above is only examples of the embodiments of the present disclosure, and various revisions are possible in accordance with the scope of claims. For example, the form (shape) of the surrounding portion 20 is not limited to the forms (shapes) of the embodiments described above.

Figure 6:
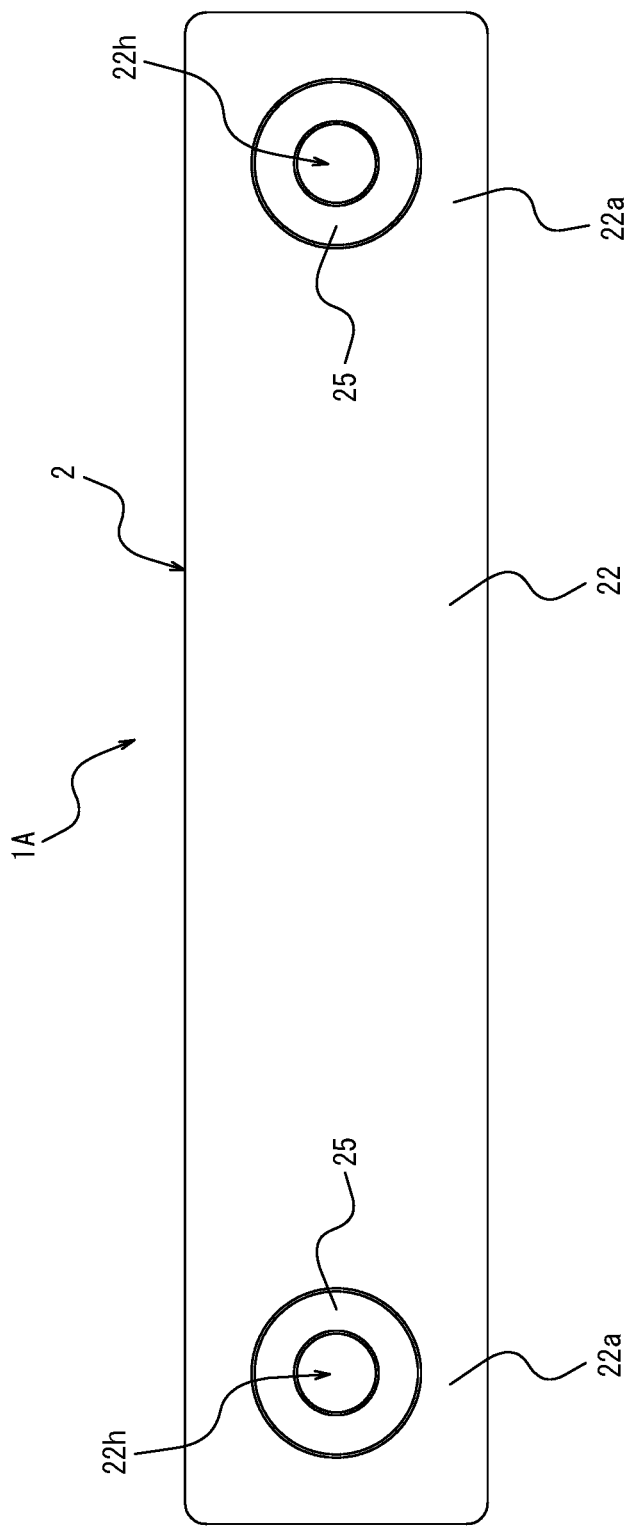
FIG. 6 is a bottom view of FIG. 1.

For example, the surrounding portion 20 is elliptical in an axial view, but can be of various shapes, such as a perfect circle and rectangle. Referring to FIGS. 1 and 12, in each of the embodiments described above, the outer circumference of the reinforcement member 3 coincides with the outer surface of the surrounding portion 20 of the bracket body 2. However, by projecting the outer circumference of the reinforcement member 3 outwardly from the outer surface of the surrounding portion 20, a step can be provided between the outer circumference of the reinforcement member 3 and the outer surface of the surrounding portion 20. In each of the above embodiments, the reinforcement member 3 is embedded in the surrounding portion 20 of the bracket body 2 as the outer surface of the bracket 1 so as to be visible from the outside. However, the reinforcement member 3 can be completely embedded in the surrounding portion 20 so as to be invisible from the outside. Referring to FIGS. 6 and 17, an attachment surface of the second surrounding portion 22 is formed with a flat surface. However, the attachment surface of the second surrounding portion 22 can be formed with a plane shaped according to the shape of a mounting side of the vehicle body or the like. Furthermore, the various configurations employed in each of the above embodiments can be replaced with each other or combined as appropriate.

REFERENCE SIGNS LIST 1, 1A, 1B bracket for anti-vibration device
A1 through hole
2 bracket body
20 surrounding portion
20a reinforcement member arrangement portion
21 first surrounding portion
211 outer circumference
212 inner circumference
213 connecting portion
22 second surrounding portion
23 recess
25 anchor
26 bottom rib
26a central bottom rib (first bottom rib)
26b second bottom rib
26c third bottom rib
26d fourth bottom rib
27 bottom groove
27a central bottom groove (first bottom groove)
27b second bottom groove
27c third bottom groove
3 reinforcement member
f1 inner circumferential-side surface of outer circumference
f2 outer circumferential-side surface of inner circumference
f3 side surface of connecting portion
f3a outer circumferential-side curved surface
f3b inner circumferential-side curved surface
f4 inner circumferential-side surface of inner circumference
f4a axial central portion of inner circumferential-side surface
f4b axial end portion of inner circumferential-side surface
G gate mark
O central axis
W1 cross sectional width of outer circumference
W2 cross sectional width of inner circumference
W3 cross sectional width of connecting portion
W4 cross sectional width of reinforcement member

The invention claimed is:

1. A bracket for an anti-vibration device comprising a bracket body made of a synthetic resin and a reinforcement member made of a fiber reinforced plastic, the bracket body having a surrounding portion surrounding a main body of the anti-vibration device wherewith the bracket is intended for use, the reinforcement member extending in a surrounding direction of the surrounding portion and being arranged on the surrounding portion, wherein a reinforcement member arrangement portion of the surrounding portion is formed of an outer circumference extending in the surrounding direction, an inner circumference extending in the surrounding direction, and a connecting portion connecting the outer circumference and the inner circumference and extending in the surrounding direction, when the reinforcement member arrangement portion is viewed in a cross section perpendicular to the surrounding direction, the reinforcement member arrangement portion is in a shape of a letter I in the cross section in which a cross sectional width of the connecting portion is narrower than a cross sectional width of the outer circumference and a cross sectional width of the inner circumference, and the reinforcement member is arranged on the outer circumference of the reinforcement member arrangement portion.

2. The bracket for an anti-vibration device according to claim 1, wherein the cross sectional width of the inner circumference is narrower than the cross sectional width of the outer circumference.

3. The bracket for an anti-vibration device according to claim 2, wherein when the inner circumference is viewed in a cross section perpendicular to the surrounding direction, an inner circumferential-side surface of the inner circumference has a convex outline convex toward an inner circumferential side.

4. The bracket for an anti-vibration device according to claim 3, wherein of the convex outline, an axial central portion of the inner circumferential-side surface is formed of an outwardly convex curve.

5. The bracket for an anti-vibration device according to claim 2, wherein a plurality of bottom ribs that extend in an axial perpendicular direction and are arranged at intervals in an axial direction are formed in a bottom of the bracket body, and a thickness of the plurality of bottom ribs is thicker the closer the bottom ribs are to a center of the bottom in the axial direction.

6. The bracket for an anti-vibration device according to claim 1, wherein the cross sectional width of the outer circumference is same as the cross sectional width of the inner circumference, or narrower than the cross sectional width of the inner circumference.

7. The bracket for an anti-vibration device according to claim 6, wherein when the inner circumference is viewed in a cross section perpendicular to the surrounding direction, an inner circumferential-side surface of the inner circumference has a convex outline convex toward an inner circumferential side.

8. The bracket for an anti-vibration device according to claim 7, wherein of the convex outline, an axial central portion of the inner circumferential-side surface is formed of an outwardly convex curve.

9. The bracket for an anti-vibration device according to claim 6, wherein a plurality of bottom ribs that extend in an axial perpendicular direction and are arranged at intervals in an axial direction are formed in a bottom of the bracket body, and a thickness of the plurality of bottom ribs is thicker the closer the bottom ribs are to a center of the bottom in the axial direction.

10. The bracket for an anti-vibration device according to claim 1, wherein when the inner circumference is viewed in a cross section perpendicular to the surrounding direction, an inner circumferential-side surface of the inner circumference has a convex outline convex toward an inner circumferential side.

11. The bracket for an anti-vibration device according to claim 10, wherein of the convex outline, an axial central portion of the inner circumferential-side surface is formed of an outwardly convex curve.

12. The bracket for an anti-vibration device according to claim 11, wherein of the convex outline, an axial end portion of the inner circumferential-side surface is formed of a straight line.

13. The bracket for an anti-vibration device according to claim 10, wherein of the convex outline, an axial end portion of the inner circumferential-side surface is formed of a straight line.

14. The bracket for an anti-vibration device according to claim 10, wherein a plurality of bottom ribs that extend in an axial perpendicular direction and are arranged at intervals in an axial direction are formed in a bottom of the bracket body, and a thickness of the plurality of bottom ribs is thicker the closer the bottom ribs are to a center of the bottom in the axial direction.

15. The bracket for an anti-vibration device according to claim 1, wherein a plurality of bottom ribs that extend in an axial perpendicular direction and are arranged at intervals in an axial direction are formed in a bottom of the bracket body, and a thickness of the plurality of bottom ribs is thicker the closer the bottom ribs are to a center of the bottom in the axial direction.

16. The bracket for an anti-vibration device according to claim 15, wherein an inner circumferential-side surface of the outer circumference has a gate mark for injection molding.

17. The bracket for an anti-vibration device according to claim 1, wherein an inner circumferential-side surface of the outer circumference has a gate mark for injection molding.

18. The bracket for an anti-vibration device according to claim 1, wherein a side surface of the connecting portion includes a curved surface that is connected to an inner circumferential-side surface of the outer circumference and is formed of an inwardly concave curve when viewed in the cross section, and a curved surface that is connected to an outer circumferential-side surface of the inner circumference and is formed of an inwardly concave curve when viewed in the cross section.

19. The bracket for an anti-vibration device according to claim 1, wherein an inner circumferential-side surface of the outer circumference, an outer circumferential-side surface of the inner circumference, and a side surface of the connecting portion form a concave portion extending in the surrounding direction, in the reinforcement member arrangement portion of the surrounding portion.

20. A bracket with an anti-vibration device comprising a bracket body made of a synthetic resin and a reinforcement member made of a fiber reinforced plastic, the bracket body having a surrounding portion surrounding a main body of the anti-vibration device, the reinforcement member extending in a surrounding direction of the surrounding portion and being arranged on the surrounding portion, wherein a reinforcement member arrangement portion of the surrounding portion is formed of an outer circumference extending in the surrounding direction, an inner circumference extending in the surrounding direction, and a connecting portion connecting the outer circumference and the inner circumference and extending in the surrounding direction, when the reinforcement member arrangement portion is viewed in a cross section perpendicular to the surrounding direction, the reinforcement member arrangement portion is in a shape of a letter I in the cross section in which a cross sectional width of the connecting portion is narrower than a cross sectional width of the outer circumference and a cross sectional width of the inner circumference, and the reinforcement member is arranged on the outer circumference of the reinforcement member arrangement portion.

* * * * *